(12) United States Patent
Nishii

(10) Patent No.: US 12,130,780 B2
(45) Date of Patent: Oct. 29, 2024

(54) INFORMATION PROCESSING APPARATUS AND CONTROL METHOD OF INFORMATION PROCESSING APPARATUS

(71) Applicant: SHARP KABUSHIKI KAISHA, Osaka (JP)

(72) Inventor: Yuichi Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/465,364

(22) Filed: Sep. 2, 2021

(65) Prior Publication Data

US 2022/0100706 A1    Mar. 31, 2022

(30) Foreign Application Priority Data

Sep. 28, 2020   (JP) ................................. 2020-162670

(51) Int. Cl.
| | | |
|---|---|---|
| *G06F 16/00* | (2019.01) | |
| *G06F 16/16* | (2019.01) | |
| *G06F 16/176* | (2019.01) | |
| *H04N 1/44* | (2006.01) | |

(52) U.S. Cl.
CPC .......... *G06F 16/176* (2019.01); *G06F 16/168* (2019.01); *H04N 1/4433* (2013.01)

(58) Field of Classification Search
CPC .... G06F 16/176; G06F 16/168; H04N 1/4433
See application file for complete search history.

(56) References Cited

U.S. PATENT DOCUMENTS

| | | | |
|---|---|---|---|
| 10,574,838 B2 | 2/2020 | Morita | |
| 2007/0159652 A1* | 7/2007 | Sato ................... | H04N 1/00225 358/1.15 |
| 2007/0185974 A1* | 8/2007 | Kawasaki .......... | H04N 1/32058 707/999.1 |
| 2011/0265144 A1 | 10/2011 | Ikeda et al. | |
| 2018/0288186 A1 | 10/2018 | Kato | |
| 2019/0104219 A1 | 4/2019 | Morita | |
| 2021/0014371 A1* | 1/2021 | Utoh ................... | H04N 1/00411 |

FOREIGN PATENT DOCUMENTS

| | | |
|---|---|---|
| CN | 102238008 A | 11/2011 |
| CN | 109600530 A | 4/2019 |
| JP | 2005-167357 A | 6/2005 |
| JP | 2005159704 A | 6/2005 |
| JP | 2005-260369 A | 9/2005 |
| JP | 2016-208549 A | 12/2016 |
| JP | 2018173951 A | 11/2018 |
| JP | 2019040255 A | 3/2019 |

* cited by examiner

*Primary Examiner* — Thu Nguyet T Le
(74) *Attorney, Agent, or Firm* — ScienBiziP, P.C.

(57) ABSTRACT

An information processing apparatus includes: an inputter which receives an input of identification information of a user; a storage including a shared storage area to be used by the user; and a controller which adds the identification information to folder path information, which is information on a folder path to the shared storage area, according to a result of authentication of the identification information.

8 Claims, 21 Drawing Sheets

FIG. 4

| SHARED STORAGE AREA | | IDENTIFICATION INFORMATION |
|---|---|---|
| | PERSONAL STORAGE AREA | USER NAME (LOGIN NAME) |
| FIRST STORAGE AREA | User1-1 | User1-1 |
| | User1-2 | User1-2 |
| | ⋮ | ⋮ |
| | User1-m | User1-m |
| SECOND STORAGE AREA | User2-1 | User2-1 |
| | User2-2 | User2-2 |
| | ⋮ | ⋮ |
| | User2-m | User2-m |
| ⋮ | | |
| n-TH STORAGE AREA | Usern-1 | Usern-1 |
| | Usern-2 | Usern-2 |
| | ⋮ | ⋮ |
| | Usern-m | Usern-m |

FIG. 19

| SHARED STORAGE AREA | | IDENTIFICATION INFORMATION | FOLDER PATH |
|---|---|---|---|
| | PERSONAL STORAGE AREA | USER NAME (LOGIN NAME) | |
| FIRST STORAGE AREA | User1-1 | User1-1 | http://ppppqqqrrrsss/SHARED FOLDER/aa DEVELOPMENT DEPARTMENT/User1-1 |
| | User1-2 | User1-2 | http://ppppqqqrrrsss/SHARED FOLDER/aa DEVELOPMENT DEPARTMENT/User1-2 |
| | ... | ... | ... |
| | User1-m | User1-m | http://ppppqqqrrrsss/SHARED FOLDER/aa DEVELOPMENT DEPARTMENT/User1-m |
| SECOND STORAGE AREA | User2-1 | User2-1 | http://ppppqqqrrrsss/SHARED FOLDER/bb DEVELOPMENT DEPARTMENT/User2-1 |
| | User2-2 | User2-2 | http://ppppqqqrrrsss/SHARED FOLDER/bb DEVELOPMENT DEPARTMENT/User2-2 |
| | ... | ... | ... |
| | User2-m | User2-m | http://ppppqqqrrrsss/SHARED FOLDER/bb DEVELOPMENT DEPARTMENT/User2-m |
| ... | ... | ... | ... |
| n-TH STORAGE AREA | Usern-1 | Usern-1 | http://ppppqqqrrrsss/SHARED FOLDER/nn DEVELOPMENT DEPARTMENT/Usern-1 |
| | Usern-2 | Usern-2 | http://ppppqqqrrrsss/SHARED FOLDER/nn DEVELOPMENT DEPARTMENT/Usern-2 |
| | ... | ... | ... |
| | Usern-m | Usern-m | http://ppppqqqrrrsss/SHARED FOLDER/nn DEVELOPMENT DEPARTMENT/Usern-m |

FIG. 21

| AUTHENTICATION METHOD |
|---|
| KNOWLEDGE-BASED AUTHENTICATION<br>· USER NAME (LOGIN NAME), IDENTIFICATION NUMBER, REGISTRATION NUMBER, ETC.<br>+<br>PASSWORD (ONE-TIME PASSWORD, ETC.)<br><br>POSSESSION AUTHENTICATION<br>· TOKEN, KEY, IC CARD, PORTABLE TERMINAL SUCH AS SMARTPHONE, ETC.<br><br>BIOMETRIC AUTHENTICATION<br>· FINGERPRINT AUTHENTICATION, PALM PRINT AUTHENTICATION, VASCULAR AUTHENTICATION, IRIS AUTHENTICATION, FACIAL AUTHENTICATION, VOICEPRINT AUTHENTICATION, RETINA AUTHENTICATION, ETC. |

ND CONTROL METHOD OF
INFORMATION PROCESSING APPARATUS
AND CONTROL METHOD OF
INFORMATION PROCESSING APPARATUS

BACKGROUND OF THE INVENTION

Field of the Invention

The present invention relates to, for example, an information processing apparatus.

Description of the Background Art

Information processing apparatuses, which are referred to as multi-function peripherals equipped with a plurality of functions such as a print function, a facsimile function, a scanning function, or a data storage function, have become widespread in companies, offices or at homes.

The multi-function peripherals include ones that implement not only the above functions alone, but also further improve convenience for users by combining the aforementioned functions. For example, by combining the scanning function with the data storage function, image data generated by the scanning function can be stored in a storage device that is permitted to be shared inside or outside the device.

For example, Japanese Unexamined Patent Application Publication No. 2005-167357 discloses an image forming apparatus by which a folder, which is permitted to be shared by a personal computer (PC) connected to a network, can be specified from the multi-function peripheral side, and a user can specify, in executing the function of sending image data generated by a scanning function to the specified folder, a path of the folder corresponding to the destination of the image data on an operation screen.

With the technique of the publication indicated above, even in a case where the user himself/herself is to be the destination of sending, for example, an operation on the operation screen such as specifying the sending destination folder is required, and if an incorrect sending destination is specified, the user may not be able to obtain the desired data.

In view of the problem as described above, an object of the present disclosure is to provide an information processing apparatus and a control method of whereby an operation on an operation screen is eliminated as much as possible, and the desired data can be reliably stored in a specified storage device.

SUMMARY OF THE INVENTION

In order to solve the above-described problem, an information processing apparatus according to the present disclosure is characterized by including: an inputter which receives an input of identification information of a user; a storage including a shared storage area to be used by the user; and a controller which adds the identification information to folder path information, which is information on a folder path to the shared storage area, according to a result of authentication of the identification information.

Also, a control method of an information processing apparatus according to the present disclosure pertains to a control method of controlling an information processing apparatus provided with a storage including a shared storage area to be used by a user, in which the control method is characterized by including: an input step of receiving an input of identification information of the user; and a control step of adding the identification information to folder path information, which is information on a folder path to the shared storage area, according to a result of authentication of the identification information.

According to the present disclosure, it is possible to provide an information processing apparatus and a control method of an information processing apparatus whereby an operation on an operation screen is eliminated as much as possible, and the desired data can be reliably stored in a specified storage device.

BRIEF DESCRIPTION OF THE DRAWINGS

FIG. 4 is a diagram illustrating a correspondence table of the first embodiment;

FIG. 19 is a diagram illustrating a correspondence table of the second embodiment;

FIG. 21 is a diagram illustrating an authentication method according to the third embodiment.

DESCRIPTION OF THE PREFERRED EMBODIMENTS

In the following, an embodiment for implementing the present disclosure will be described with reference to the accompanying drawings. In the present embodiment, a configuration of a multi-function peripheral provided with a plurality of functions such as a print function, a facsimile function, a scanning function, or a data storage function, as an example of an information processing apparatus, will be described. The multi-function peripheral of the present embodiment is configured such that the aforementioned functions can be implemented alone or in combination with each other. Note that the following embodiments have been presented by way of example only, and the technical scope of the invention as recited in the appended claims is not limited by the description given below.

1. First Embodiment

1.1 Functional Configuration

Figure 1:
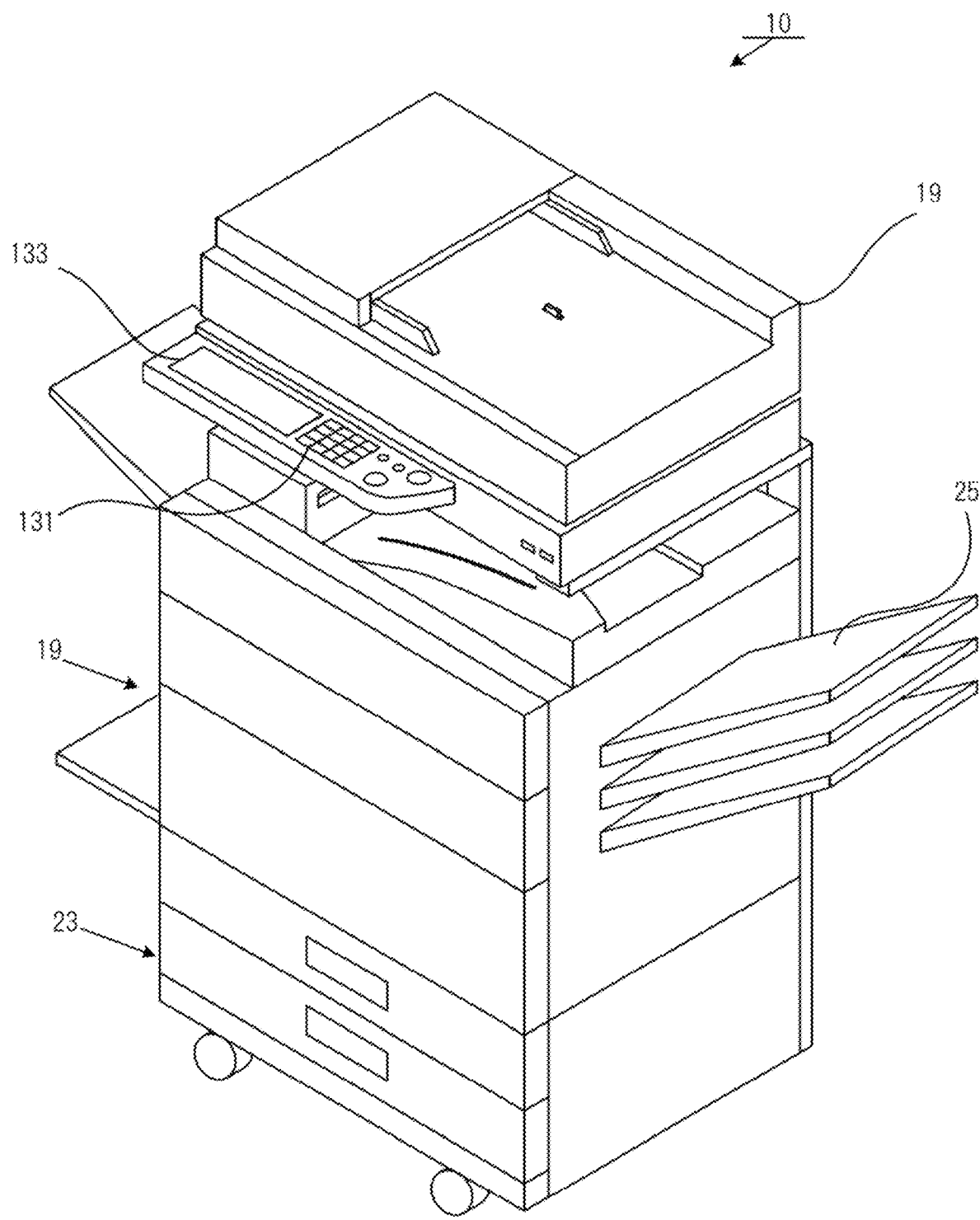
FIG. 1 is an external perspective view of a multi-function peripheral according to a first embodiment.
Figure 2:
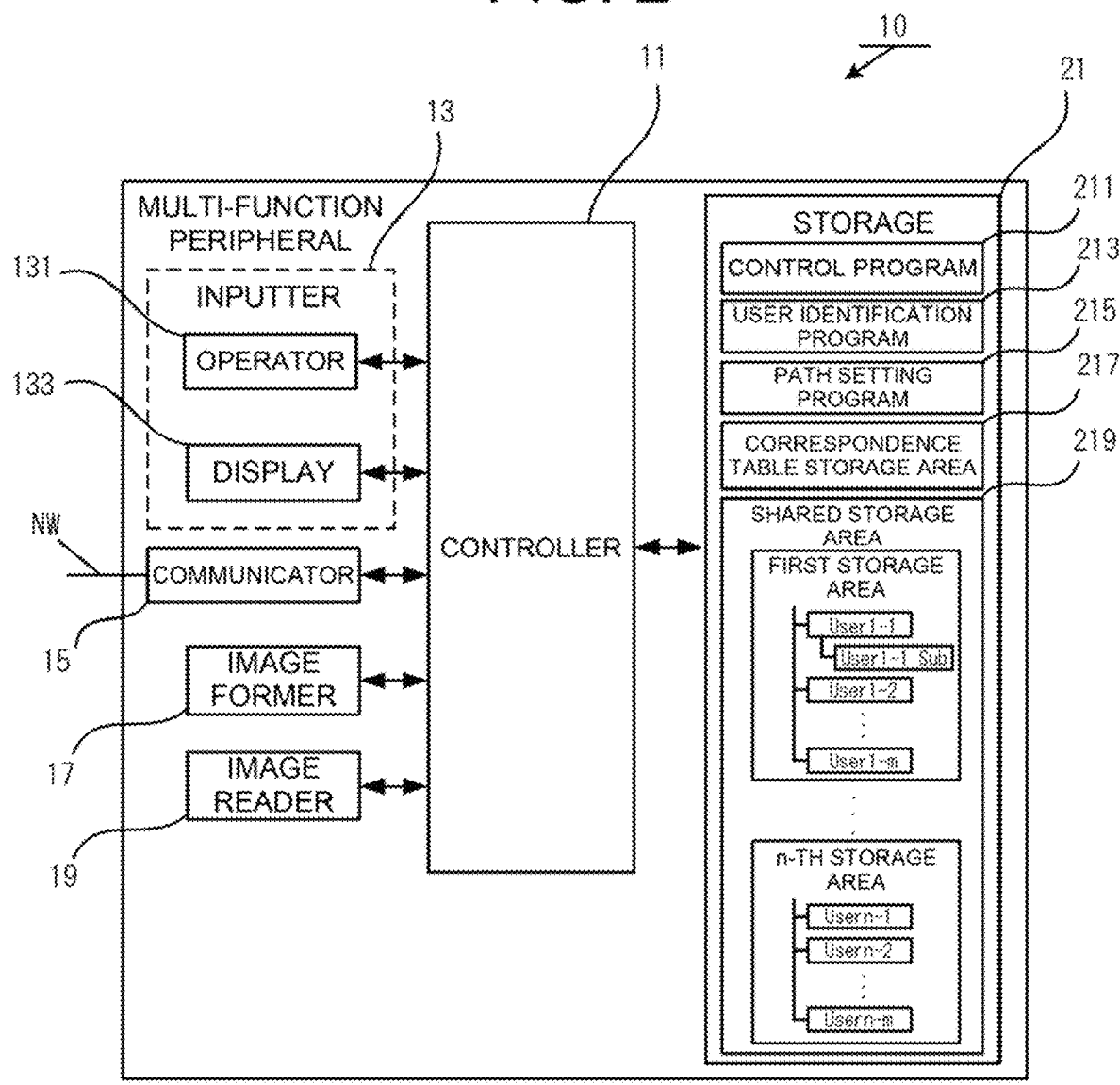
FIG. 2 is a functional configuration diagram of the multi-function peripheral according to the first embodiment.

The configuration of a multi-function peripheral 10 according to the present embodiment will be described by referring to FIGS. 1 and 2. FIG. 1 is an external perspective view of the multi-function peripheral 10, and FIG. 2 is a functional configuration diagram of the multi-function peripheral 10. As illustrated in FIG. 2, the multi-function peripheral 10 is provided with a controller 11, an inputter 13, a communicator 15, an image former 17, an image reader 19, and a storage 21.

The controller 11 controls the multi-function peripheral 10 as a whole. The controller 11 is composed of, for example, one or more arithmetic devices (such as central processing units [CPUs]). The controller 11 implements various functions by reading and executing various programs stored in the storage 21. In the present embodiment, the controller 11 implements the respective functions by reading and executing a control program 211, a user identification program 213, and a path setting program 215 which will be described later.

The inputter 13 includes an operator 131 which receives inputs of information by a user, and a display 133 which displays the information to the user. The operator 131 can be constituted by for example, a hardware key (e.g., a numeric keypad), buttons, and the like. Alternatively, the operator 131 can be configured as a touch panel on which input can be made via an input screen displayed on the display 133. In this case, as a method for detecting an input on the touch panel, a method such as a resistive film method, an infrared method, an electromagnetic induction method, or a capacitive sensing method may be employed. The display 133 can be constituted by, for example, a liquid crystal display (LCD) or an organic electro-luminescence (EL) display.

The communicator 15 connects to other devices via a network such as a local area network (LAN), a wide area network (WAN), the Internet, or a public telephone line network, and transmits and receives various kinds of information. The communicator 15 is configured as, for example, a communicable interface, and may employ either a wired or wireless connection or a combined use of the aforementioned connections as the connection method.

The image former 17 feeds paper, as a recording medium, from a paper feed tray 23, for example, and then discharges the paper to a paper discharge tray 25 after an image based on image data has been formed on the fed paper. The image former 17 can be constituted by, for example, a laser printer or the like that uses an electrophotographic method. The image former 17 performs image formation by using toners supplied from toner cartridges corresponding to respective toner colors (e.g., yellow, magenta, cyan, and black).

The image reader 19 generates image data by reading an image to be read. The image reader 19 can be constituted by a scanner device or the like which generates digital data by using an image sensor such as a charge-coupled device (CCD) or a contact image sensor (CIS) to convert an image into an electric signal, and quantizing and encoding the electric signal.

The storage 21 stores various programs necessary for the operation of the multi-function peripheral 10, and various kinds of data. The storage 21 can be constituted by, for example, a solid state drive (SSD), which is a semiconductor memory, or a hard disk drive (HDD)

In the present embodiment, the storage 21 stores the control program 211, the user identification program 213, and the path setting program 215, and secures a correspondence table storage area 217 and a shared storage area 219.

The control program 211 is a program that the controller 11 reads in controlling the inputter 13, the communicator 15, the image former 17, the image reader 19, or a mechanism or the like necessary for driving the device, which is not illustrated. As the controller 11 reads the control program 211 in starting the device, for example, the multi-function peripheral 10 can implement each of the functions such as the print function, the facsimile function, the scanning function, or the data storage function.

The user identification program 213 is a program that the controller 11 reads when the user logs into the multi-function peripheral 10. The controller 11, which has read the user identification program 213, performs authentication processing of the user in question on the basis of authentication information that has been input by the user.

The path setting program 215 is a program that the controller 11 reads in associating identification information such as a login name of the user with a personal storage area secured in the shared storage area 219 of the storage 21 for which sharing is permitted to the user. Also, the path setting program 215 is read by the controller 11 when automatic setting of a folder path to the personal storage area of the shared storage area 219 is enabled. The controller 11 which has read the path setting program 215 sets, when the authentication of a login user is successful, and the automatic setting of a folder path to the personal storage area is enabled, the folder path to the personal storage area of the shared storage area 219 by referring to a correspondence table. Meanwhile, when the automatic setting of a folder path to the personal storage area is not enabled, the folder path to the shared storage area 219 is set on the basis of folder path information directly input by the user.

The correspondence table storage area 217 is a recording area which stores, in the form of a table, identification information of a login user and each shared storage area allocated to the login user to be associated with each other.

The shared storage area 219 is a storage area being secured with the purpose of being shared and used by respective login users. A login user can store, for example, electronic data such as image data according to the purpose or use, in the shared storage area (personal storage area) distributed to the user himself/herself. In the example shown in FIG. 2, the shared storage area 219 indicates the state in which a plurality of recording areas constituted from a first storage area to an n-th storage area are secured. In each of the storage areas constituted from the first storage area to the n-th storage area, personal folders, which correspond to the personal storage areas that can be shared by the respective login users (e.g., User1-1 to User1-m in the first storage area), are secured.

1.2 Flow of Processing

Next, a flow of processing according to the present embodiment will be described by referring to FIGS. 3 to 6. First, by referring to FIGS. 3 and 4, a flow of processing of associating identification information such as the login name of the user with the personal storage area, which is secured in the shared storage area 219 of the storage 21 for which sharing is permitted to the user in question, will be described. The processing described with reference to FIG. 3 is processing that the controller 11 executes by reading the path setting program 215.

Note that the processing described with reference to FIG. 3 relates to processing to be performed when a login user, who logs into the multi-function peripheral 10 and uses the device, starts sharing of the shared storage area 219 of the storage 21. Once the identification information of the login user and the personal storage area secured in the shared storage area 219 of the storage 21 have been associated with each other, the controller 11 can generate a folder path to the personal storage area that the login user shares by referring to the correspondence table shown in FIG. 4.

Figure 3:
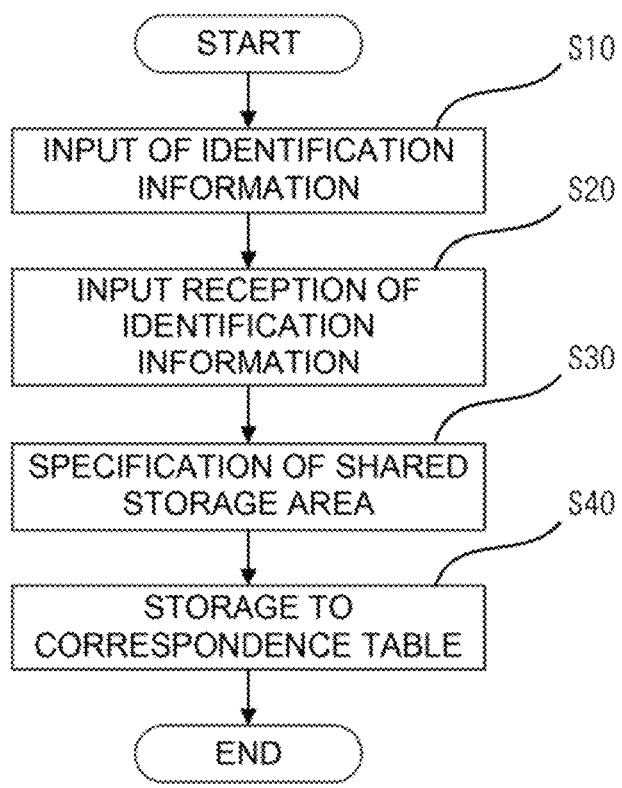
FIG. 3 is a flowchart illustrating a flow of processing in the first embodiment.

First, in step S10 of FIG. 3, the user inputs the login name as identification information via a predetermined input screen.

In step S20, the controller 11 receives an input of the identification information which has been input by the login user.

Next, in step S30, the login user specifies the personal storage area of the shared storage area 219 of the storage 21 to be shared.

In step S40, the controller 11 stores the identification information of the login user received in step S20 and the personal storage area specified in S30 to be associated with each other in the correspondence table.

FIG. 4 represents one configuration example of the correspondence table indicating the association between the identification information of the user and the personal storage area secured in the shared storage area 219. As shown in FIG. 4, in relation to the "personal storage area" which is subordinate to the "first storage area" specified by the user as the shared storage area 219, for example, each of a plurality of users having the login names, which are User1-1 to User1-m, as the identification information is associated and stored. Similarly, in relation to the "personal storage area" which is subordinate to the "second storage area" specified by the user as the shared storage area 219, each of a plurality of users having the login names, which are User2-1 to User2-m, as the identification information is associated and stored, and in relation to the "personal storage area" which is subordinate to the "n-th storage area", each of a plurality of users having the login names, which are Usern-1 to Usern-m, as the identification information is associated and stored.

Next, processing which is from a login of a user to the multi-function peripheral 10 to display of a folder path to the personal storage area of the shared storage area 219 that the logged-in user shares will be described by referring to FIG. 5. Note that the present processing is executed as the controller 11 reads mainly the user identification program 213 and the path setting program 215.

First, in step S50, an input of a login name as the identification information via a predetermined login screen is received from the user.

In step S60, the controller 11 performs authentication of the identification information whose input has been received, and then determines, in step S70, whether the authentication is successful. Here, if the authentication of the login user is successful (step S70; Yes), the controller 11 determines, in step S80, whether a use mode of the device corresponds to a shared storage area use mode. Here, if the controller 11 determines that the use mode of the device corresponds to the shared storage area use mode (step S80; Yes), the controller 11 determines, in step S90, whether automatic setting for setting of a folder path to the personal storage area is enabled. The determination by the controller 11 for the above is performed on the basis of determination of whether the login user has selected the automatic setting of a folder path to the personal storage area via a predetermined selection screen.

If the automatic setting of a folder path to the personal storage area is enabled (step S90; Yes), the controller 11 refers to the correspondence table of FIG. 4, adds the login name, as the identification information of the login user, to a folder path of the shared storage area 219 that this login user shares, and generates a folder path to the personal storage area that this login user shares (step S100).

In step S110, the controller 11 displays the folder path generated in step S100 on a predetermined display screen and ends the processing.

Meanwhile, if the automatic setting of a folder path to the personal storage area is not enabled (step S90; No), in step S120, the controller 11 makes an input request of a folder path to the login user.

In step S130, when a folder path to the shared storage area 219 as desired by the login user is input, the controller 11 receives the input of the folder path (step S140).

Then, the controller 11 displays the folder path received in step S140 on the predetermined display screen and ends the processing (S110).

Figure 6:
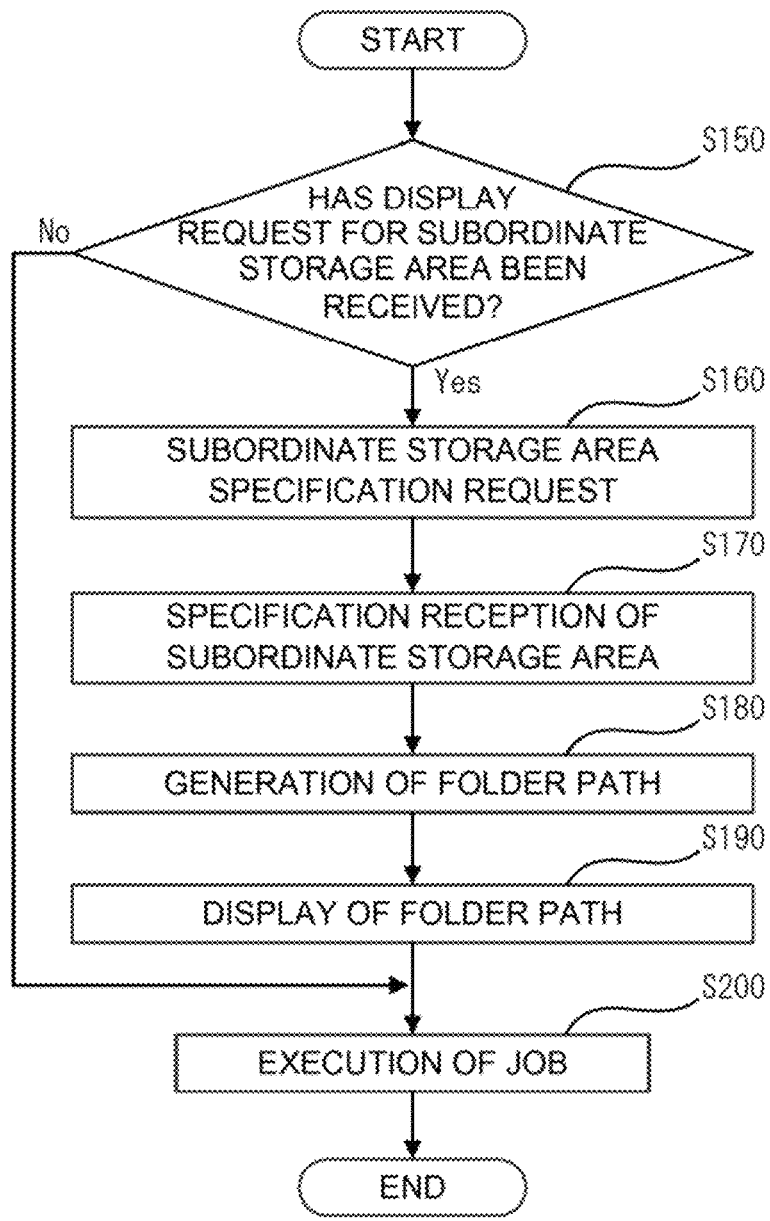
FIG. 6 is a flowchart illustrating a flow of processing in the first embodiment.

Next, processing to be performed in the case of receiving, in a state where the folder path to the personal storage area is being displayed, a display request for a subordinate storage area, which is positioned subordinate to the personal storage area in question, will be described by referring to FIG. 6.

When the controller 11 receives a display request for a subordinate storage area from a login user (step S150; Yes), the controller 11 requests the login user to specify the subordinate storage area (step S160).

In step S170, when specification of the subordinate storage area as desired by the login user is received, the controller 11 generates a folder path to the subordinate storage area in question (step S180).

In step S190, the controller 11 displays the generated folder path on a display screen.

When the display of the folder path to the subordinate storage area is received, the login user proceeds to the subordinate storage area, and confirms the contents of the subordinate storage area. Further, in a case where a document or the like is stored within the subordinate storage area, for example, the login user executes the job such as printing of the document or sending of the same to the other device (step S200).

Meanwhile, if the login user does not make a display request for a subordinate storage area (step S150; No), the controller 11 does not particularly execute the processing pertaining to step S160 to step S190. In a case where the login user has specified a job for a document or the like stored in the shared storage area 219 related to the folder path being displayed, the controller 11 executes the job.

1.3 Example of Operation

Next, an example of operation according to the present embodiment will be described by referring to FIGS. 7 to 15. In describing the example of operation, the shared storage area 219 of the storage 21 will be referred to as "shared folder", the first storage area will be referred to as "aa development department folder", and User1-1, who is a login user who logs into the multi-function peripheral 10 will be referred to as "User01". Note that the name "User01" also serves as the name of a personal folder, which is located subordinate to the aa development department folder, and corresponds to the personal storage area that User01, who is the login user, exclusively uses. The present example of operation pertains to a multi-function peripheral installed in a certain company, and assumes an example in which storage areas for respective development departments (e.g., aa development department to nn development department) are secured within a shared folder that is shared by the users who use the device, and the users (e.g., User01 to Usern) belonging to the development department use the multi-function peripheral 10.

Figure 7:
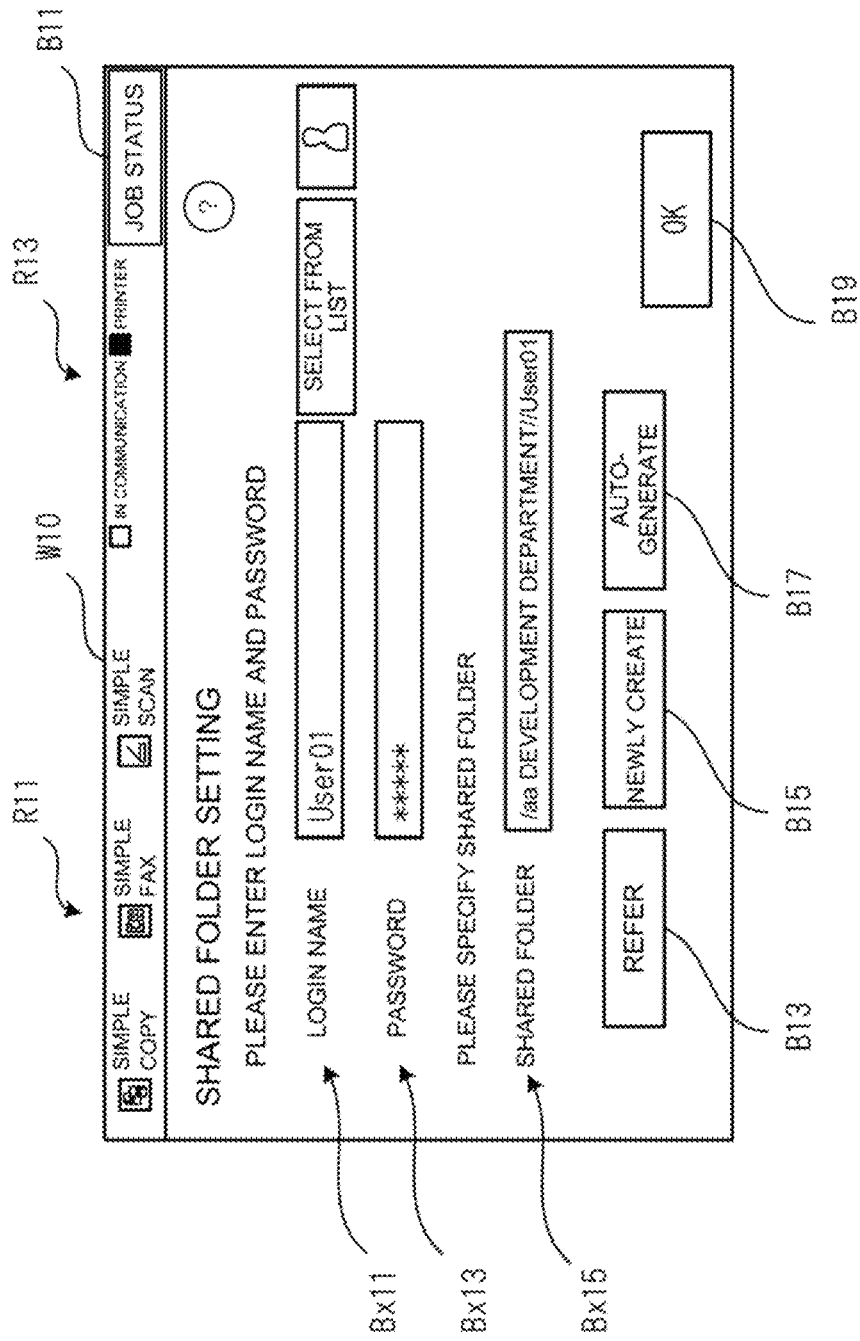
FIG. 7 is a diagram for illustrating an example of operation in the first embodiment.

FIG. 7 represents one configuration example of a shared folder setting screen W10 which the controller 11 displays on a screen of the display 133, when a login user (user name: User01), who logs into the multi-function peripheral 10 and uses the device, starts sharing of his/her personal folder subordinate to the aa development department folder. Note that the present example of operation pertains to processing that the controller 11 executes by reading the path setting program 215, and corresponds to the processing described with reference to FIG. 3. Incidentally, in the present specification, processing in which the controller 11 reads the necessary program and image data, and causes the display 133 to display a predetermined screen is simply described as "display on the screen".

The shared folder setting screen W10 shown in FIG. 7 includes a function display area R11, a status display area R13, a job status checking button B11, a login name input box Bx11, a password input box Bx13, a shared folder specification input box Bx15, a reference button B13, a new creation button B15, an auto-generation button B17, and an OK button B19.

The function display area R11 is an area in which job functions that can be executed by the multi-function peripheral 10 are displayed. The present example of operation corresponds to a case where "Simple Copy", "Simple Fax", and "Simple Scan" are displayed as the job functions that can be executed.

The status display area R13 is an area in which the device status of the multi-function peripheral 10 is displayed. The present example of operation corresponds to a case where the multi-function peripheral 10 functions as a printer.

The job status checking button B11 is a checking button which receives an instruction input by a user when a job function being executed by the multi-function peripheral 10 is to be checked. When pressing of the job status checking button B11 is received, the controller 11 gives a notification to the user by causing a status checking screen (not shown) of the job function being executed by the multi-function peripheral 10 to be displayed on the screen.

The login name input box Bx11 is an input box which receives an input of a login name of the login user who logs into the multi-function peripheral 10 and uses the device. The controller 11 receives the login name input in the login name input box Bx11 as the identification information of the login user. In this case, the login name may be selected from a list registered in advance.

The password input box Bx13 is an input box which receives an input of a password as the authentication information of the login user who has input his/her login name in the login name input box Bx11. The controller 11 performs the authentication processing of the login user by using the login name which has been input in the login name input box Bx11, and the password which has been input in the password input box Bx13. Note that the password for use in the authentication of the login user may either be stored together with the correspondence table shown in FIG. 4, or involve password management with security measures taken separately from the correspondence table.

The shared folder specification input box Bx15 is an input box which receives an input of the name of the personal folder that the login user starts sharing. The present example of operation corresponds to a case where the personal folder "User01" subordinate to the aa development department folder is directly input in the above-mentioned box by the login user.

The reference button B13 is a button which receives reference specification for the folders positioned subordinate to the shared folder, when an input is to be made in the shared folder specification input box Bx15.

The new creation button B15 is a button which receives an instruction input when a personal folder, which the login user starts sharing, is to be newly created.

The auto-generation button B17 is a button which receives an instruction input when a personal folder, which the login user starts sharing, is to be automatically generated. In this case, for example, as a folder name, a wide variety of naming, such as a login user name, an ID number assigned to the login user, a sequential serial number of a personal folder based on those which have been created so far by the login user, the date and time that the personal folder is created, classification of the file to be stored, and a sequential serial number of a personal folder based on those created in the past according to the purpose and use, such as conference minutes and quotes, is possible. However, the folder name is not particularly limited as long as the folder name is one that can be uniquely identified by the login user. When the auto-generation button B17 is pressed and selected, it is possible to automatically generate a personal folder having a specific name subordinate to the "shared folder/aa development department folder" even if a personal folder name ("User01" in the present example) is not specifically input subordinate to the "shared folder/aa development department folder" in the shared folder specification input box Bx15.

The OK button B19 is a button which receives an input approval by the user. When pressing of the OK button B19 is received, the controller 11 associates the login name input in the login name input box Bx11 with the personal folder that has been set, and stores the associated login name and personal folder in the correspondence table illustrated in FIG. 4.

Figure 8:
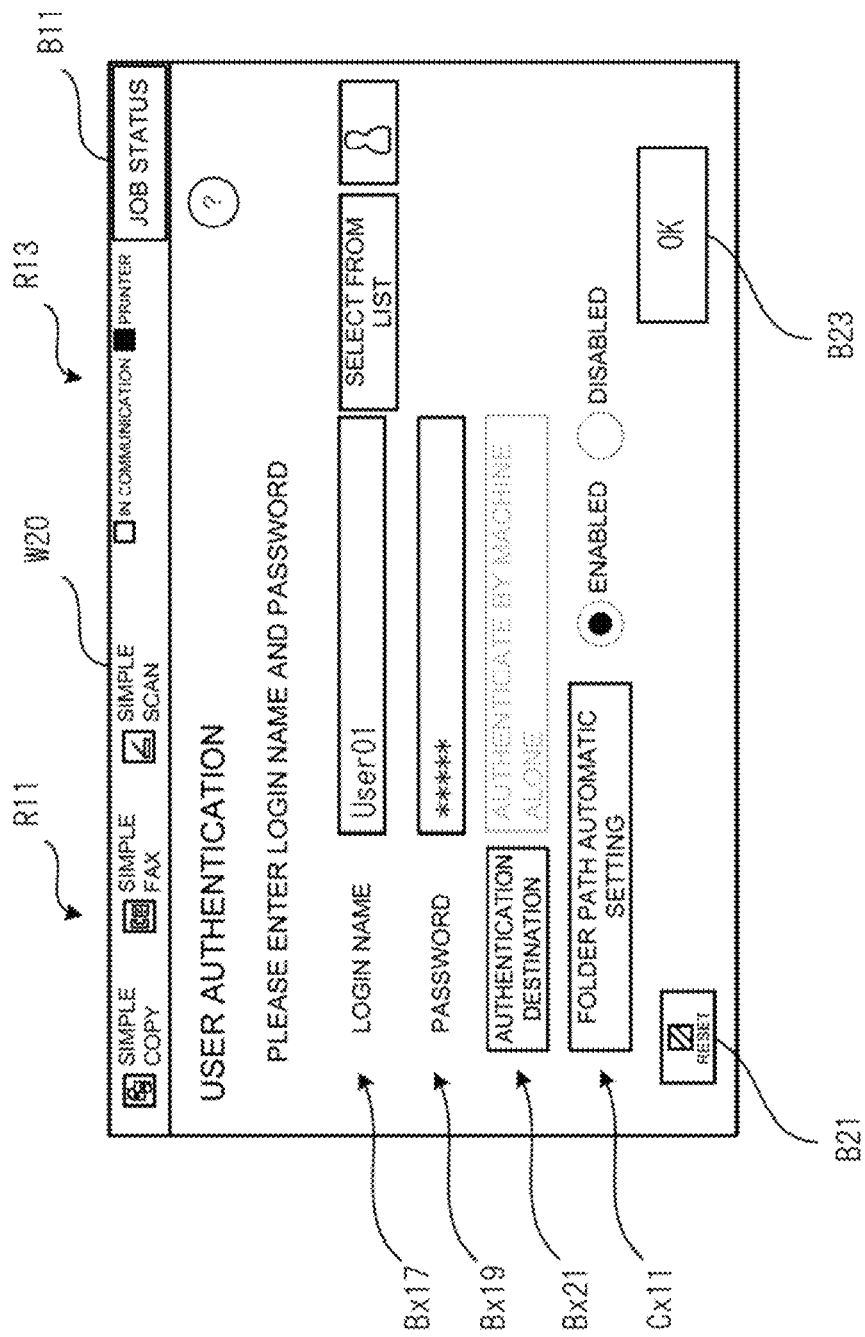
FIG. 8 is a diagram for illustrating an example of operation in the first embodiment.

FIG. 8 represents one configuration example of a login screen W20 of the multi-function peripheral 10. Note that the present example of operation pertains to processing that the controller 11 executes by reading the user identification program 213 mainly, and corresponds to the processing of step S50 described with reference to FIG. 5. Here, the same reference numerals are assigned to the same configurations as those of the shared folder setting screen W10 described with reference to FIG. 7, and explanation thereof is omitted.

The login screen W20 includes the function display area R11, the status display area R13, the job status checking button B11, a login name input box Bx17, a password input box Bx19, an authentication destination input box Bx21, a folder path automatic setting check box Cx11, a reset button B21, and an OK button B23.

The login name input box Bx17 receives an input of the login name of the login user who logs into the multi-function peripheral 10.

The password input box Bx19 is an input box which receives an input of a password of the login user who has input his/her login name in the login name input box Bx17.

The authentication destination input box Bx21 receives an input of a destination where the login user is to be authenticated. The present example of operation indicates an example in which the machine alone, in other words, the controller 11, performs the login authentication by reading the user identification program 213. Note that the destination where the login user is to be authenticated is not limited to that of the present example of operation. That is, for example, a management server or the like connected via a network, etc., may be set to the authentication destination.

The folder path automatic setting check box Cx11 is a check box which receives an input of whether to enable or disable automatic setting of a folder path to the personal folder (User01) positioned subordinate to the shared folder/aa development department. The present operation corresponds to a case where "Enabled" is selected.

The reset button B21 is a button which receives an instruction input when an input to the login name input box Bx17, the password input box Bx19, the authentication destination input box Bx21, or the folder path automatic setting check box Cx11, for example, is to be reset.

The OK button B23 is a button which receives an input approval by the login user. When pressing of the OK button B23 is received, the controller 11 executes the authentication processing of the login user pertaining to step S60 to step S70 of FIG. 5.

Figure 9:
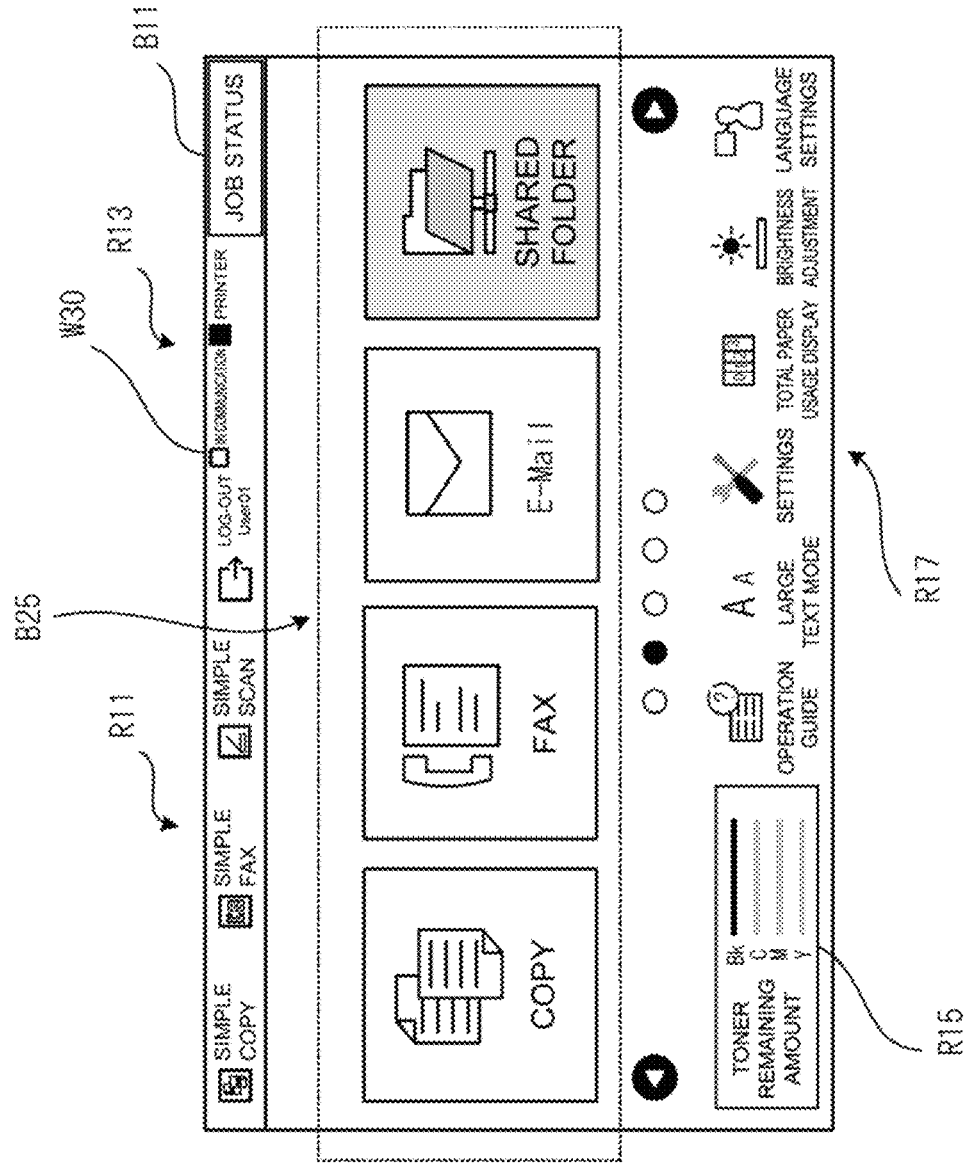
FIG. 9 is a diagram for illustrating an example of operation in the first embodiment.

FIG. 9 represents one configuration example of a use mode selection screen W30 of the multi-function peripheral 10. Note that the present example of operation corresponds to the processing of step S80 of FIG. 5.

The use mode selection screen W30 includes the function display area R11, the status display area R13, the job status checking button B11, an information display area R15, a setting display area R17, and a use mode selection button B25.

The information display area R15 displays various kinds of information corresponding to the operational status of the device, such as the remaining amount of toner, the remaining amount of consumables such as the remaining amount of paper, device setting details, and the state of communication. The present example of operation corresponds to a case where the remaining amount of toner is displayed.

The setting display area R17 is an area in which each setting item related to setting confirmation/change for the multi-function peripheral 10 is displayed. In the setting display area R17, each setting item is configured as a selection button so as to enable the login user to select each of the setting items. As the login user presses the button corresponding to the selected setting item, the user can confirm the contents of the selected setting item, and make a setting change. The present example of operation corresponds to a case where an operation guide, a large text mode, settings, total paper usage display, brightness adjustment, and language settings are displayed as the setting items.

Respective buttons such as Copy, Fax, E-mail, and Shared Folder buttons that are displayed as the use mode selection buttons B25 are buttons which receive selection of the use mode of the multi-function peripheral 10 by the login user. The login user can select a button of the desired mode from among the Copy button, the Fax button, the E-mail button, and the Shared Folder button, which are displayed as the use mode selection buttons B25, and press the selected button, thereby changing or determining the use mode of the multi-function peripheral 10. The present example of operation corresponds to a case where the "shared folder mode", which corresponds to the shared storage area use mode, is selected by the login user.

Figure 5:
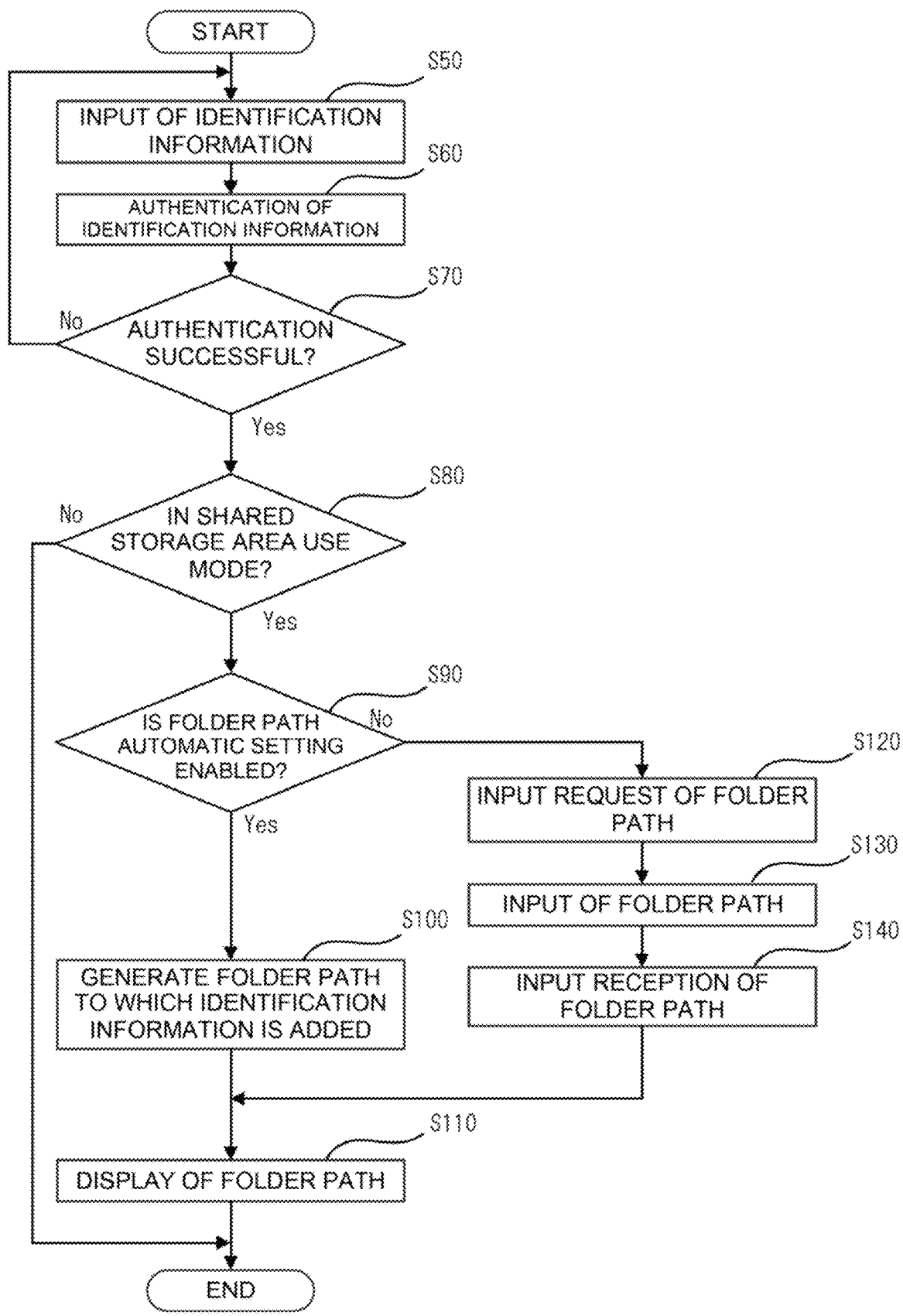
FIG. 5 is a flowchart illustrating a flow of processing in the first embodiment.

The multi-function peripheral 10 according to the present embodiment branches processing according to whether the folder path automatic setting is enabled or disabled, after performing the authentication processing of the login user pertaining to step S50 to step S70 of FIG. 5, and when the use mode of the device is the shared folder mode (shared storage area use mode).

Figure 10:
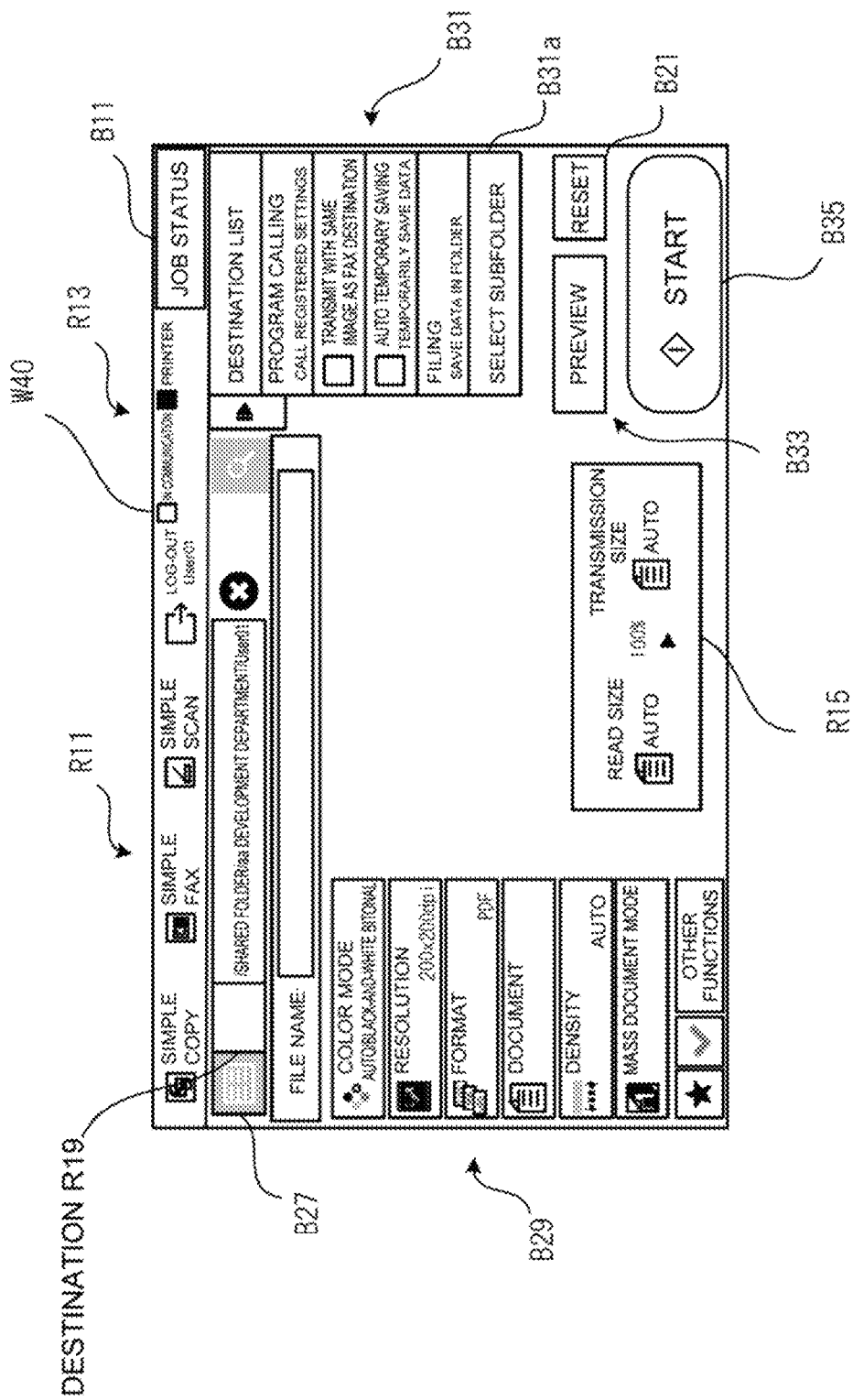
FIG. 10 is a diagram for illustrating an example of operation in the first embodiment.

FIG. 10 represents one configuration example of an operation screen W40 which the controller 11 displays on the screen when the login user has selected the folder path automatic setting to be enabled on the login screen W20 of FIG. 8. Note that the present operation pertains to processing that the controller 11 executes by reading the path setting program 215, and corresponds to step S90 to step S110 of FIG. 5. Note that the operation screen W40 illustrated in FIG. 10 corresponds to an operation screen related to storing image data generated by the scanning function of the image reader 19 in a shared storage area, or more specifically, the so-called scan-to-folder (storage) function.

The operation screen W40 includes the function display area R11, the status display area R13, the job status checking button B11, a destination display area R19, an address book button B27, a function setting button B29, a processing selection button B31, a preview button B33, the reset button B21, and a start button B35.

The destination display area R19 displays a folder path to the shared storage area where the image data generated by the scanning function of the image reader 19 is to be stored. Since the login user name is "User01" in the present example of operation, the present example of operation corresponds to a case where a folder path configured to be "/shared folder/aa development department/User01", which the controller 11 has generated by adding the login user name "User01" subordinate to the folder path that is "/shared folder/aa development department", is displayed.

The address book button B27 is a button which receives selection of using the address book which manages address information of the shared storage area (shared folder) being shared. Note that when the use mode of the device corresponds to the shared folder mode, the address book button B27 is displayed to be grayed out and cannot be selected and pressed.

The function setting buttons B29 are configured such that set values corresponding to each job function are displayed, and the set values can be changed in response to pressing of the function setting button B29 by the user. For example, when the login user wishes to change the color mode from "auto/black-and-white bitonal" to "full color", the login user can press the function setting button B29 corresponding to the setting item for color mode, and change the color mode from "auto/black-and-white bitonal" to "full color" via a displayed change screen which is not illustrated. Note that for the function setting buttons B29, items related to the job function to be executed (i.e., the scan-to-folder function in the present example of operation) are displayed preferentially.

The processing selection button B31 is a button which receives selection of processing as desired by the login user. The present example of operation corresponds to a case of displaying, when a subfolder as a subordinate storage area exists under the User01 folder, a "Select Subfolder" button B31a which enables the subfolder to be selected, in addition to displaying a "Program Calling" button and the like.

The preview button B33 is a button which receives an instruction input for preview display of a document to be read before executing the job function (i.e., the scan-to-folder function in the present example of operation).

The start button B35 is a button which receives an instruction input for execution of the job function.

As the controller 11 controls the image reader 19 in response to pressing of the start button B35, image data is generated by reading of the document, and the generated image data is stored in the User01 folder identified by the folder path configured to be "/shared folder/aa development department/User01".

In this way, as the login user merely inputs the login name via the login screen W20 illustrated in FIG. 8, and selects the shared folder mode as the device use mode via the use mode selection screen W30 illustrated in FIG. 9, it is possible to automatically generate a folder path to the personal folder of the login user. Further, the login user can execute a job of a scanner function, etc., with a destination displayed on the screen in the destination display area R19 being the destination of storing the image data or the like. By this feature, even in a case where the read image data is to be sent to the user himself/herself, for example, the login user is not required to perform an operation on an operation screen, such as specifying the sending destination folder, and thus specifying an incorrect sending destination can be avoided.

Figure 11:
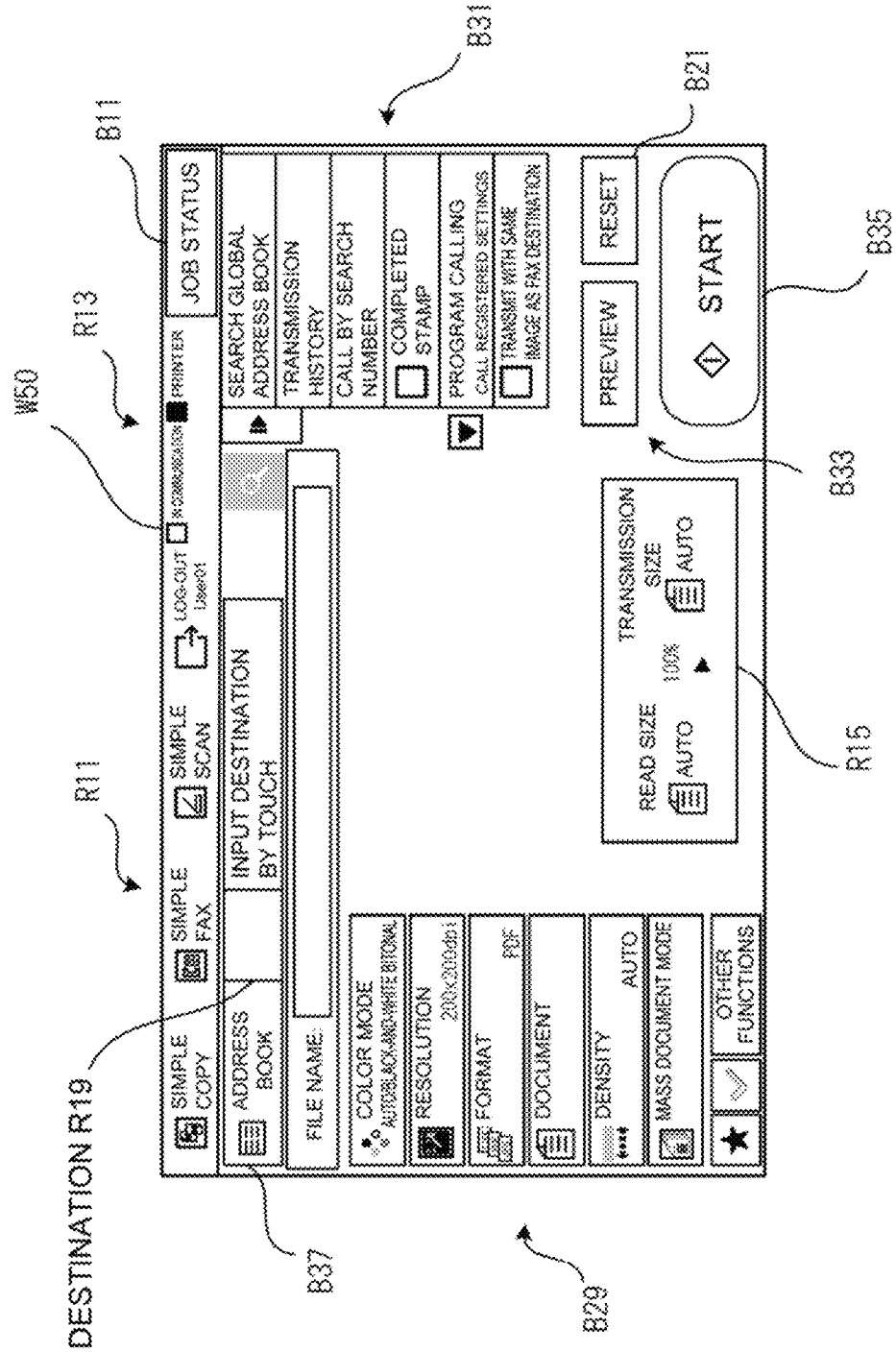
FIG. 11 is a diagram for illustrating an example of operation in the first embodiment.

FIG. 11 represents one configuration example of an operation screen W50 which the controller 11 displays on the screen when the login user has selected the folder path automatic setting to be disabled on the login screen W20 of FIG. 8. Note that the present operation pertains to processing that the controller 11 executes by reading the path setting program 215, and corresponds to step S110, and steps S120 to S140 of FIG. 5. Also, the operation screen W50 illustrated in FIG. 11 corresponds to an operation screen related to storing image data generated by the scanning function of the image reader 19 within a personal folder specified by the folder path input by the user, or more specifically, the so-called scan-to-folder function.

While the configuration of the operation screen W50 can be made the same as that of the operation screen W40 illustrated in FIG. 10, the operation screen W50 is different from the operation screen W40 in that an address book button B37 can be selected and pressed by the login user.

In a case where the folder path automatic setting is disabled, the controller 11 causes the operation screen W50 in which the use of the address book button B37 is in the enabled state to be displayed on the screen, thereby prompting the login user to input the folder path which specifies the destination of storing the image data generated by the scanning function of the image reader 19.

The login user operates the address book button B37, etc., thereby inputting the folder path which specifies the destination of storing the image data or the like.

When the input of the folder path using the address book is received from the login user, the controller 11 displays on the screen the input folder path in the destination display area R19. The login user executes a job of the scanner function, etc., with the destination displayed on the screen in the destination display area R19 being the destination of storing the image data or the like. Alternatively, the folder path can be input by a direct entry of the destination by the login user.

Next, an operation to be performed when a display request for a subfolder (subordinate storage area) positioned subordinate to the User01 folder is received, in a state where the folder path configured to be "/shared folder/aa development department/User01", which the controller 11 has generated by adding the login user name "User01" subordinate to the folder path that is "/shared folder/aa development department", is displayed, will be described by referring to FIG. 12.

Figure 12:
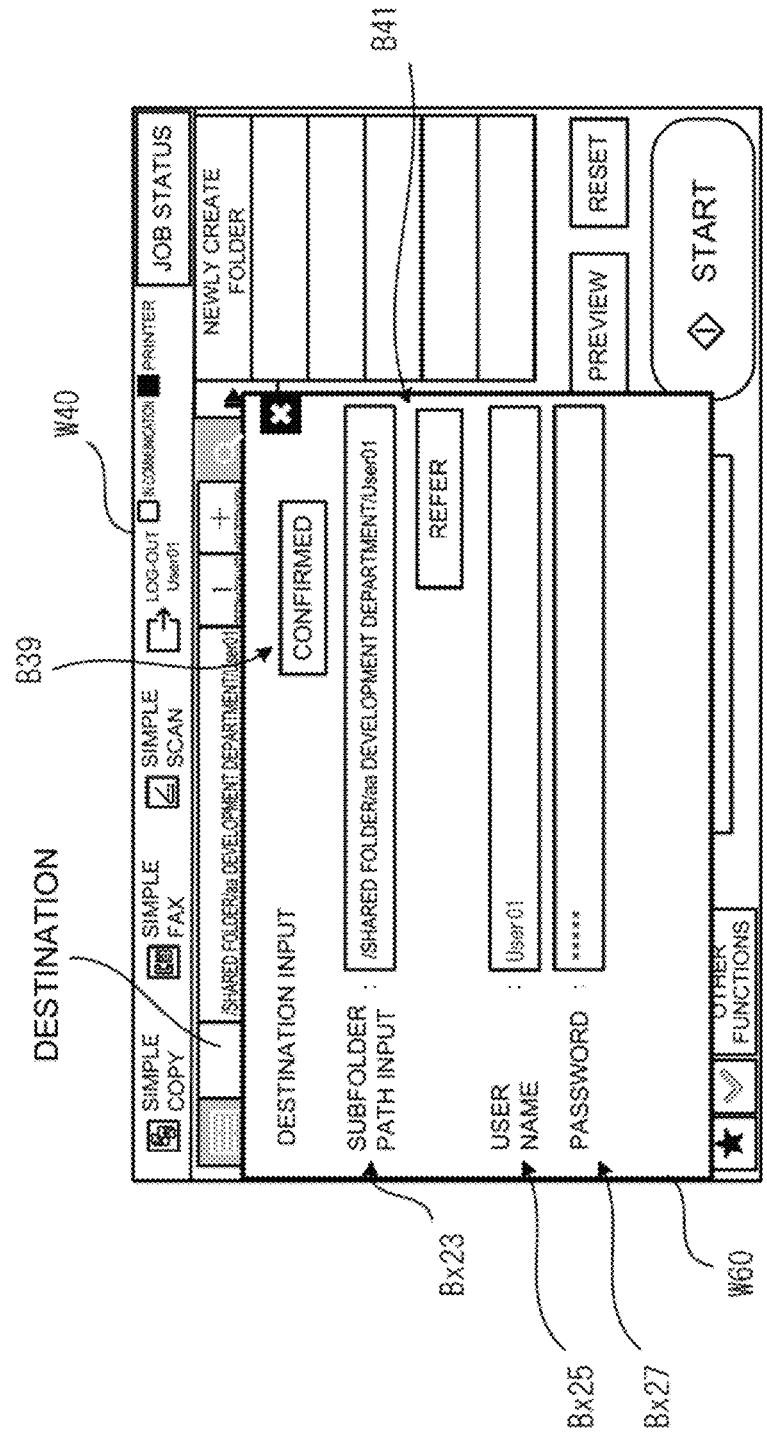
FIG. 12 is a diagram for illustrating an example of operation in the first embodiment.

A subfolder selection screen W60 shown in FIG. 12 is one configuration example of a subfolder selection screen that the controller 11 displays on the screen within the operation screen W40, in response to the pressing of the "Select Subfolder" button B31a of the processing selection button B31 of the operation screen W40 shown in FIG. 10.

The subfolder selection screen W60 includes a subfolder path input box Bx23, a confirmed button B39, a reference button B41, a user name input box Bx25, and a password input box Bx27.

The subfolder path input box Bx23 receives an input of a subfolder positioned subordinate to the User01 folder, which is identified by the folder path that is "shared folder/aa development department/User01".

The confirmed button B39 is a button which receives an instruction input by the user when the input of the folder path to the subfolder path input box Bx23 is to be confirmed.

The reference button B41 is a button which receives reference specification for the folders positioned subordinate to the User01 folder, when an input is to be made in the subfolder path input box Bx23.

The user name input box Bx25 receives an input of the login name which is the same as the login name that has been input in the login name input box Bx17 of the login screen W20 illustrated in FIG. 8. Also, as for the password input box Bx27, an input of the same password as that input in the password input box Bx19 of the login screen W20 illustrated in FIG. 8 is received.

In this way, also for the selection of the subfolder positioned subordinate to the User01 folder, which is identified by the folder path that is "shared folder/aa development department/User01", security can be ensured by performing the authentication processing by using the login user name which has been requested to be input in the login name input box Bx17 of the login screen W20, and the password which has been requested to be input in the password input box Bx19.

Figure 13:
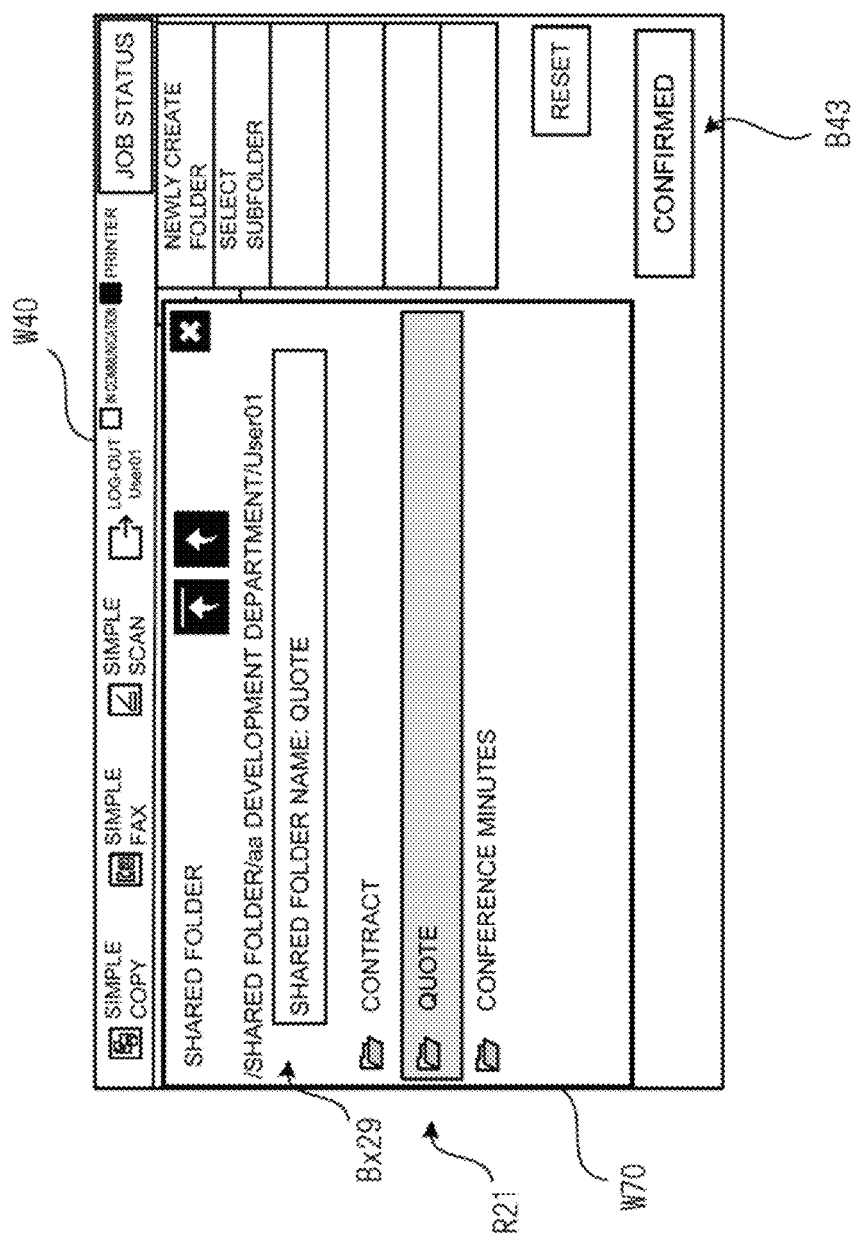
FIG. 13 is a diagram for illustrating an example of operation in the first embodiment.

FIG. 13 represents one configuration example of a subfolder display screen W70 which the controller 11 displays within the operation screen W40, in response to the pressing of the confirmed button B39 of the subfolder selection screen W60.

The subfolder display screen W70 includes a subfolder selection input box Bx29, and a subfolder display area R21.

The subfolder selection input box Bx29 receives an input of a subfolder selected from among the subfolders included in the User01 folder that are displayed in the subfolder display area R21.

The subfolder display area R21 is a display area where the subfolders included in the User01 folder are displayed. The present example of operation corresponds to a case where three types of subfolders, the contents of which are contracts, quotes, and conference minutes, included in the User01 folder are displayed.

A confirmed button B43 provided within the operation screen W40 is a button which receives confirmation of the subfolder which has been selected and input in the subfolder selection input box Bx29. The present example of operation corresponds to a case where a subfolder, the contents of which are quotes, displayed in the subfolder display area R21 is selected, and highlighting to indicate the selected state is applied.

Figure 14:
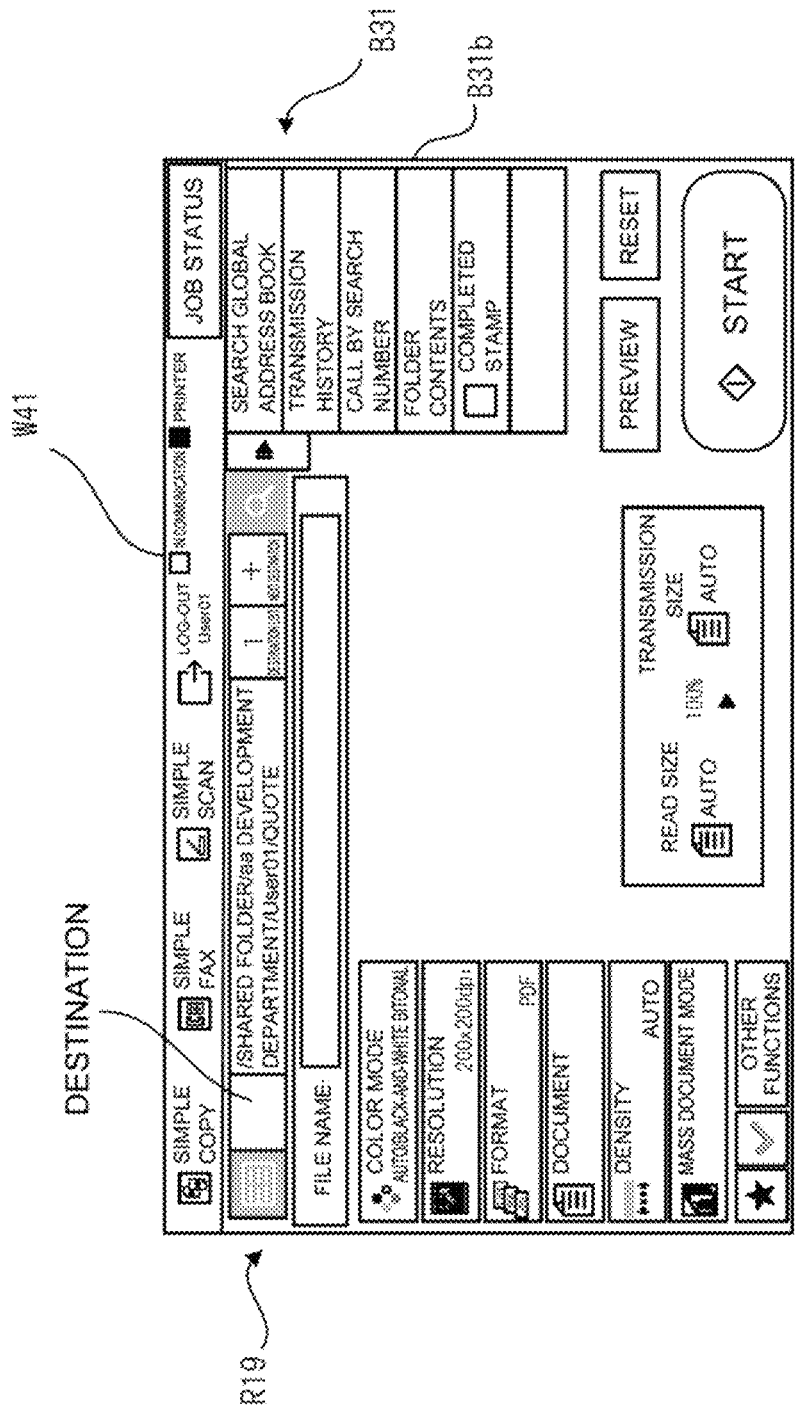
FIG. 14 is a diagram for illustrating an example of operation in the first embodiment.

FIG. 14 represents one configuration example of an operation screen W41 which the controller 11 displays on the screen, in response to the confirmation of the subfolder which has been selected and input in the subfolder selection input box Bx29 of the subfolder display screen W70. The operation screen W41 has the same display configuration as that of the operation screen W40 mentioned above.

The operation screen W41 displays a destination in the destination display area R19, in which the destination is the subfolder (Quote) included in the User01 folder for which a selection input has been received via the subfolder selection input box Bx29 of the subfolder display screen W70.

In addition, the processing selection button B31 of the operation screen W41 includes a "Folder Contents" button B31b which receives an instruction to display the folder contents of the subfolder (Quote), and this button is configured to enable display of the contents of the subfolder.

Figure 15:
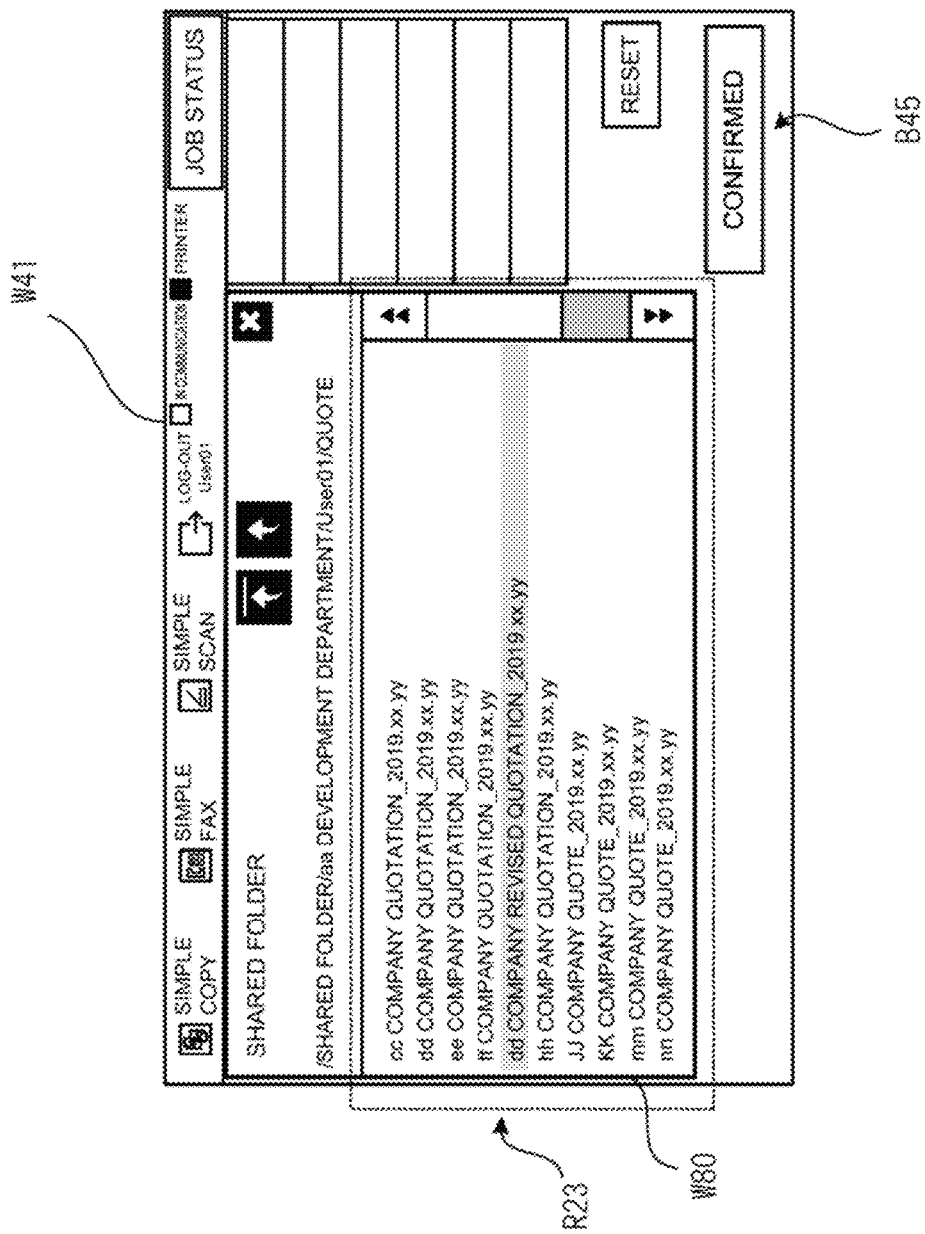
FIG. 15 is a diagram for illustrating an example of operation in the first embodiment.

FIG. 15 represents one configuration example of a subfolder contents display screen W80 which the controller 11 displays on the screen within the operation screen W41, in response to the pressing of the "Folder Contents" button B31b of the operation screen W41.

The subfolder contents display screen W80 includes a subfolder contents display area R23.

The subfolder contents display area R23 is an area in which the contents included in the subfolder ("Quote" in the present example of operation) are displayed. The present example of operation corresponds to a case of displaying the way in which a plurality of pieces of contents, such as quotes and a revised quote issued for respective companies, are stored in the subfolder.

A confirmed button B45 provided within the operation screen W41 is a button which receives confirmation of the selection of the contents displayed in the subfolder contents display area R23. By selecting and confirming the contents stored within the subfolder by the confirmed button B45, when the contents correspond to a document, for example, processing such as printing of the document or transfer of the same to another storage device can be performed.

As described above, according to the present embodiment, it is possible to provide an information processing apparatus capable of simplifying the operation on an operation screen related to specification of a data storage destination, which is enabled by eliminating the user's operation on the operation screen as much as possible, and reliably storing the desired data in the specified storage destination.

2. Second Embodiment

Next, a second embodiment will be described. The second embodiment pertains to a configuration in which a storage device in which a shared storage area is secured is provided on an external server which exists on a network. In the second embodiment, the same reference numerals are assigned to functional parts and processing that are the same as those of the first embodiment, and explanations thereof are omitted.

2.1 Overall Configuration

Figure 16:
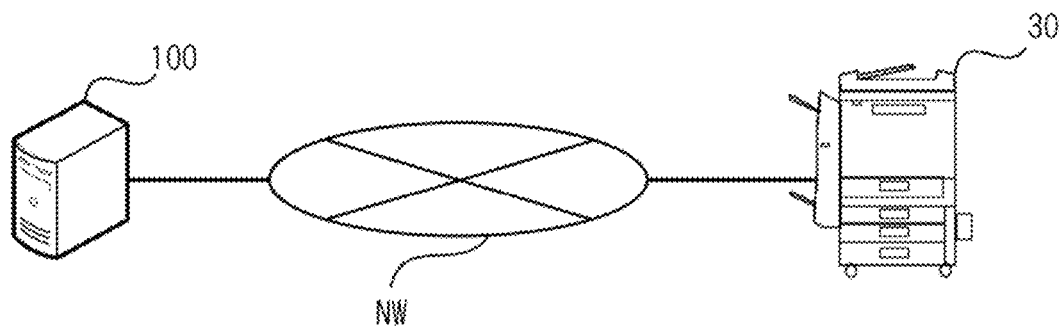
FIG. 16 is an overall view illustrating an overall configuration of a second embodiment.

FIG. 16 is an illustration for explaining the overall configuration of the present embodiment. A multi-function peripheral 30 according to the present embodiment is connected to an external file server 100 via a network NW.

2.2 Functional Configuration

Figure 17:
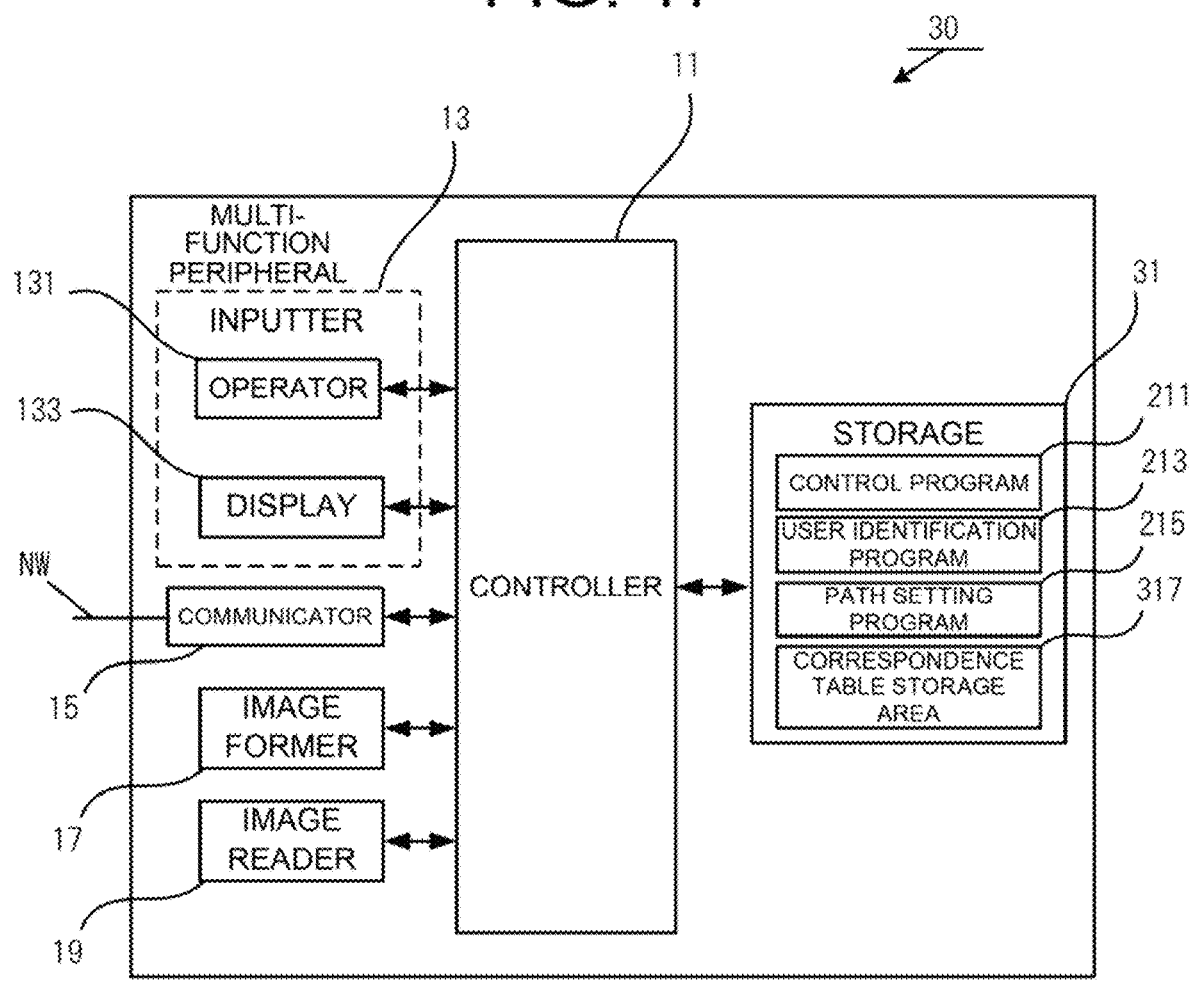
FIG. 17 is a functional configuration diagram of a multi-function peripheral according to the second embodiment.

FIG. 17 is a functional configuration diagram for explaining the functional configuration of the multi-function peripheral 30 according to the second embodiment. The multi-function peripheral 30 is provided with a controller 11, an inputter 13, a communicator 15, an image former 17, an image reader 19, and a storage 31.

The storage 31 stores a control program 211, a user identification program 213, and a path setting program 215, and secures a correspondence table storage area 317.

The correspondence table storage area 317 is a recording area which stores, in the form of a table, identification information of a user and each shared storage area allocated to the user that is on the external file server 100 to be associated with each other.

Figure 18:
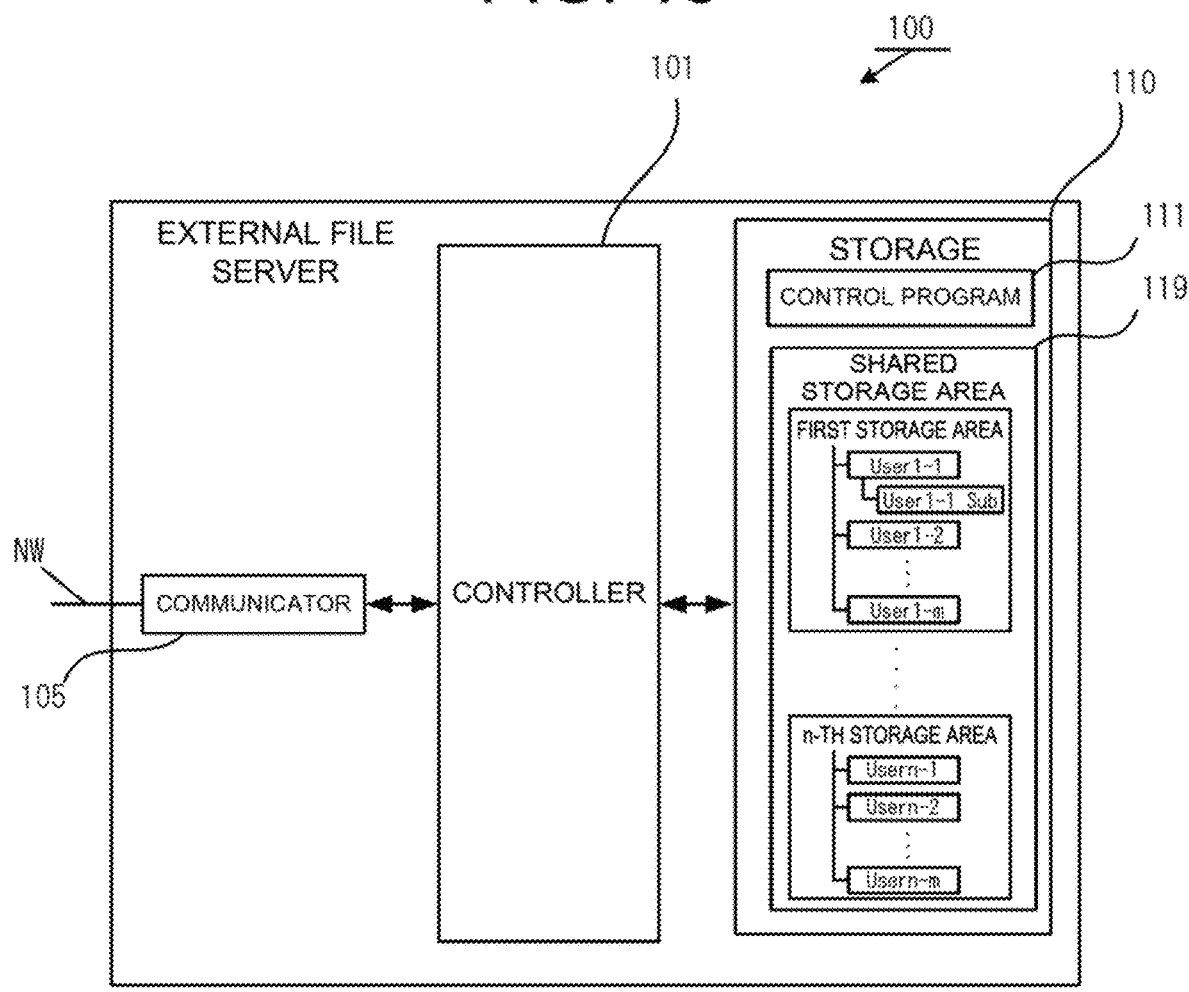
FIG. 18 is a functional configuration diagram of an external file server according to the second embodiment.

FIG. 18 is a functional configuration diagram for explaining the functional configuration of the external file server 100. The external file server 100 is provided with a controller 101, a communicator 105, and a storage 110.

The controller 101 controls the external file server 100 as a whole. The controller 101 is composed of, for example, one or more arithmetic devices (such as CPUs). The controller 101 implements various functions by reading and executing a control program stored in the storage 110.

The communicator 105 is connected to the multi-function peripheral 30 via a network such as a LAN, a WAN, or the Internet, and transmits and receives various kinds of information. The communicator 105 is configured as, for example, a communicable interface, and may employ either a wired or wireless connection or a combined use of the aforementioned connections as the connection method.

The storage 110 stores the control program necessary for the operation of the external file server 100, and various kinds of data. The storage 110 can be constituted by, for example, an SSD, which is a semiconductor memory, or an HDD.

In the present embodiment, the storage 110 stores a control program 111, and secures a shared storage area 119.

The control program 111 is a program that the controller 101 reads in controlling the communicator 105 and the storage 110, etc. The external file server 100 can provide the functions to be provided by the external file server 100 as the controller 101 reads the control program 111.

The shared storage area 119 is a storage area secured with the purpose of being shared and used by respective users of the multi-function peripheral 30. A user can store, for example, electronic data such as image data according to the purpose or use, in the shared storage area (personal storage area) distributed to the user himself/herself. In the example shown in FIG. 18, the shared storage area 119 indicates the state in which a plurality of recording areas constituted from a first storage area to an n-th storage area are secured. In each of the storage areas constituted from the first storage area to the n-th storage area, folders, which correspond to the personal storage areas that can be shared by the respective users (e.g., User1-1 to User1-m in the first storage area), are secured.

FIG. 19 represents one configuration example of a correspondence table indicating association between identification information of the user and the personal storage area secured in the shared storage area 119 of the external file server 100. As shown in FIG. 19, in relation to the "personal storage area" which is subordinate to the "first storage area" specified by the user as the shared storage area 119, for example, each of a plurality of users having the login names, which are User1-1 to User1-m, as the identification information is associated and stored. Similarly, in relation to the "personal storage area" which is subordinate to the "second storage area" specified by the user as the shared storage area 119, each of a plurality of users having the login names, which are User2-1 to User2-m, as the identification information is associated and stored, and in relation to the "personal storage area" which is subordinate to the "n-th storage area", each of a plurality of users having the login names, which are Usern-1 to Usern-m, as the identification information is associated and stored.

2.3 Flow of Processing

A flow of processing related to the present embodiment is the same as the flow of processing described in the first embodiment. When setting of a folder path to the personal storage area is made by automatic setting, the controller 11 of the multi-function peripheral 30 communicates with the external file server 100 which exists on the network, generates a folder path to which network address information of the external file server 100 is added, and displays the generated folder path to the login user (FIG. 19).

As described above, according to the second embodiment, not only can the same advantages as those of the first embodiment be obtained, but a storage capacity of the storage device incorporated into the multi-function peripheral can also be reduced since the shared storage area is configured to be provided in the external file server. Thus, it is possible to enhance the speed of the processing, and achieve reduction of the manufacturing cost, etc.

3. Third Embodiment

Next, a third embodiment will be described. The overall configuration of a multi-function peripheral according to the third embodiment can be made the same as that of the first embodiment. The multi-function peripheral according to the third embodiment is configured to further include an authentication portion, in addition to the structures of the first embodiment. In describing the third embodiment, description related to the overall configuration of the multi-function peripheral is omitted, and description of functional parts and processing that are the same as those of the first embodiment will be omitted by assigning the same reference numerals thereto.

3.1 Functional Configuration

Figure 20:
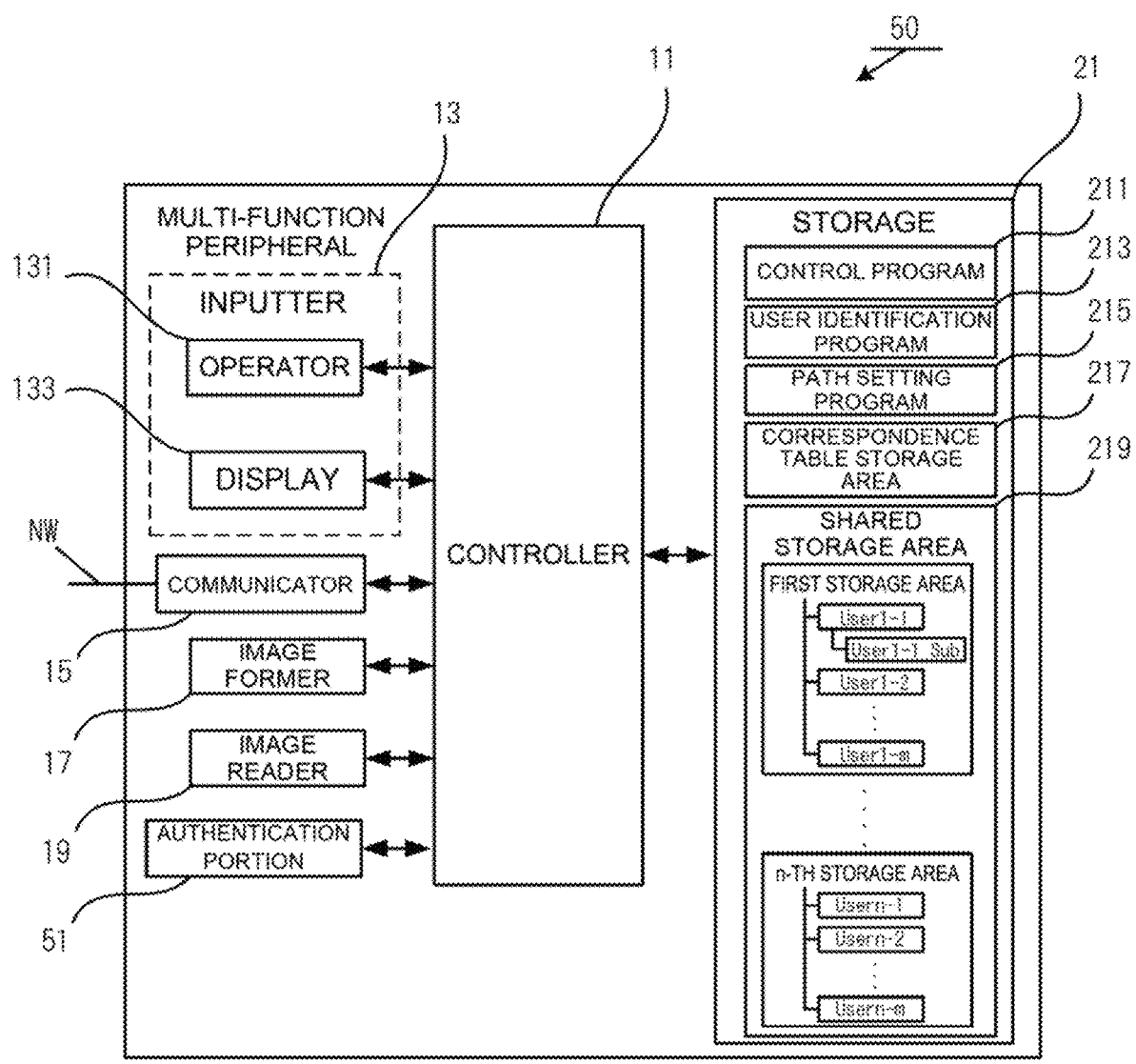
FIG. 20 is a functional configuration diagram of a multi-function peripheral according to a third embodiment.

FIG. 20 is a functional configuration diagram for explaining the functional configuration of a multi-function peripheral 50 according to the third embodiment. The multi-function peripheral 50 is provided with a controller 11, an inputter 13, a communicator 15, an image former 17, an image reader 19, a storage 21, and an authentication portion 51.

The authentication portion 51 performs possession authentication using a token, a key, an IC card, a smartphone, and the like, and biometric authentication, such as fingerprint authentication, palm print authentication, and vascular authentication, as illustrated in FIG. 21, in addition to, or separately from, knowledge-based authentication in which authentication is performed by a login user name and a password as described in the first embodiment and the second embodiment.

3.2 Flow of Processing

A flow of processing related to the present embodiment is the same as the flow of processing described in the first embodiment. The controller 11 of the multi-function peripheral 50 performs authentication of the identification information of the login user via the authentication portion 51.

For example, by mounting a reader such as a card reader, a near field communication (NFC) reader, or a magnetic reader which reads information recorded on an integrated circuit (IC) chip or a magnetic tape, etc., or a fingerprint sensor or the like for performing fingerprint authentication into the multi-function peripheral 50, the controller 11 can authenticate the login user without requiring a direct entry of the login user name.

As described above, according to the third embodiment, in addition to being able to obtain the advantages of the first embodiment or the second embodiment, improvement in the security, and saving the login user of the trouble of making inputs can further be achieved.

4. MODIFICATION

The present invention is not limited to the above-described embodiments, and various modifications can be made. That is, an embodiment obtained by combining technical means modified as appropriate without departing from the spirit of the present invention is also included in the technical scope of the present invention.

Further, while the above-described embodiments have parts described separately for convenience of explanation, it is needless to say that the embodiments may be combined and executed within the technically possible range.

In the present embodiment, a configuration in which the shared storage area is provided in a single storage device has been described. However, the present embodiment may take a form that storage areas (the first storage area to the n-th storage area in the present embodiment) included in the shared storage area are distributed into different storage devices, respectively. By doing so, the risk caused by a failure of the storage device can be reduced.

Note that the program to be operated on each device in the embodiment is a program which controls the CPU or the like (i.e., a program for causing a computer to function) so as to implement the functions of the above-described embodiments. Moreover, the information handled by these devices is temporarily stored in a temporary storage device (for example, a RAM) at the time of processing, and then stored in various storage devices such as a read-only memory (ROM) and an HDD, and is read, corrected, and written by the CPU as needed.

Here, as the recording medium for storing the program, a semiconductor medium (for example, a ROM, a non-volatile memory card, etc.), an optical recording medium/magneto-optical recording medium (for example, a DVD (Digital Versatile Disc), an MO (Magneto Optical Disc), an MD (Mini Disc), a CD (Compact Disc), a BD (Blu-ray Disk [registered trademark], etc.), a magnetic recording medium (for example, a magnetic tape, a flexible disk, etc.) or the like may be used. Further, not only are the functions of the above-described embodiments implemented by executing the loaded program, but the functions of the present invention may also be implemented by processing performed in cooperation with an operating system or other application programs, etc., on the basis of the instructions of the program.

Furthermore, when distribution to the market is aimed, the program may be stored in a portable recording medium in order for the program to be distributed, or may be transferred to a server computer connected via a network such as the Internet. In this case, a storage device of the server computer is also included in the present invention as a matter of course.

What is claimed is:

1. An information processing apparatus comprising:
   a display that displays an input screen;
   one or more memories that include a shared storage area, the shared storage area having a personal storage area distributed to each user, the one or memories storing computer-executable instructions; and
   one or more controllers that execute the computer-executable instructions stored in the one or more memories, wherein the input screen contains a folder path automatic setting section for setting, by a user, automatic setting of a folder path to the personal storage area to be enabled or disabled, the one or more controllers further:
- when an identification information of the user is received via the input screen, perform authentication of the identification information;
- when the authentication of the identification information is successful, a shared folder mode is selected, and the automatic setting of the folder path is set to be enabled, generate folder path information associated with the personal storage area by adding the identification information to folder path information associated with the shared storage area; and
- display the generated folder path information associated with the personal storage area on the display.

2. The information processing apparatus according to claim 1, wherein the identification information includes a login name of the user.

3. The information processing apparatus according to claim 1, wherein the folder path information associated with the shared storage area includes destination information on the shared storage area.

4. The information processing apparatus according to claim 3, wherein the identification information is added subordinate to the folder path information associated with the shared storage area.

5. The information processing apparatus according to claim 4, wherein when the one or more controllers display the generated folder path information associated with the personal storage area, the one or more controllers further display, on the display, that the identification information is added subordinate to the folder path information associated with the shared storage area.

6. The information processing apparatus according to claim 1, wherein when the automatic setting of the folder path is set to be disabled, the one or more controllers further receive an input selected by the user as the folder path information associated with the personal storage area.

7. A control method of controlling an information processing apparatus comprising one or more memories including a shared storage area, the shared storage area having a personal storage area distributed to each user, the one or more memories storing computer-executable instructions, the method comprising:
- receiving, via an input screen displayed on a display, an identification information of a user, a selection of a shared folder mode, and information indicating that automatic setting of a folder path to the personal storage area is enabled or disabled; and
- executing, by one or more controllers, the computer-executable instructions stored in the one or more memories to:
  - perform authentication of the identification information when the identification information of the user is received;
  - generate, when the authentication of the identification information is successful, the shared folder mode is selected, and the automatic setting of the folder path is set to be enabled, folder path information associated with the personal storage area by adding the identification information to folder path information associated with the shared storage area; and
  - display the generated folder path information associated with the personal storage area on the display.

8. The information processing apparatus according to claim 1, wherein the one or more controllers further display the generated folder path information associated with the personal storage area on a destination display area included in an operation screen.

* * * * *